(12) United States Patent
Pamplin et al.

(10) Patent No.: US 12,441,626 B2
(45) Date of Patent: Oct. 14, 2025

(54) METHODS FOR THE PURIFICATION OF MOLYBDENUM-99 WITH PHASE TRANSFER AGENTS

(71) Applicant: ABILENE CHRISTIAN UNIVERSITY, Abilene, TX (US)

(72) Inventors: Kim Pamplin, Abilene, TX (US); Diego Zometa, Abilene, TX (US)

(73) Assignee: Abilene Christian University, Abilene, TX (US)

( * ) Notice: Subject to any disclaimer, the term of this patent is extended or adjusted under 35 U.S.C. 154(b) by 0 days.

(21) Appl. No.: 18/771,047

(22) Filed: Jul. 12, 2024

(65) Prior Publication Data

US 2025/0109035 A1    Apr. 3, 2025

Related U.S. Application Data

(60) Provisional application No. 63/516,840, filed on Jul. 31, 2023.

(51) Int. Cl.
    *C01G 39/02*    (2006.01)

(52) U.S. Cl.
    CPC .......... *C01G 39/02* (2013.01); *C01P 2002/84* (2013.01)

(58) Field of Classification Search
    CPC ...................................................... C01G 39/02
    See application file for complete search history.

(56) References Cited

U.S. PATENT DOCUMENTS

| | | | |
|---|---|---|---|
| 3,730,833 A | 5/1973 | Cremeans | |
| 3,843,765 A | 10/1974 | Anderson | |
| 4,005,178 A | 1/1977 | LeBlac | |
| 4,069,100 A | 1/1978 | Cooper | |
| 4,075,060 A | 2/1978 | Colburn | |
| 4,094,953 A | 6/1978 | Hadi et al. | |
| 7,011,736 B1 | 3/2006 | Miller et al. | |
| 7,914,600 B2 | 3/2011 | Withers et al. | |
| 7,960,581 B2 | 6/2011 | Vreede et al. | |
| 8,226,760 B2 | 7/2012 | Collier et al. | |
| 8,821,824 B2 | 9/2014 | Ghirelli et al. | |
| 9,228,579 B2 | 1/2016 | Stobbe | |
| 9,847,149 B2 | 12/2017 | Spoerke et al. | |
| 10,388,419 B2 | 8/2019 | Sakuma et al. | |

(Continued)

FOREIGN PATENT DOCUMENTS

| | | |
|---|---|---|
| CA | 3179052 | 11/2021 |
| CA | 3085050 | 12/2021 |

(Continued)

OTHER PUBLICATIONS

U.S. Appl. No. 18/663,976, Pamplin et al., May 14, 2024.

(Continued)

*Primary Examiner* — James A Fiorito
(74) *Attorney, Agent, or Firm* — King & Spalding

(57) ABSTRACT

The present invention is directed towards methods for isolating molybdenum compounds from a mixture of fission products. The mixture of fission products may be extracted from a molten salt reactor system. Utilizing a phase transfer agent, the molybdenum compounds may be extracted from an aqueous solution into an organic solution, thereby isolating the molybdenum compound from the mixture of fission products. Molybdate may then be isolated from the resulting organic solution and provided to a generator to facilitate transformation into technitum-99m.

17 Claims, 11 Drawing Sheets

(56) References Cited

U.S. PATENT DOCUMENTS

| | | |
|---|---|---|
| 10,416,045 B2 | 9/2019 | Launiere et al. |
| 10,434,494 B2 | 10/2019 | Kobayashi et al. |
| 10,566,101 B2 | 2/2020 | Corpora |
| 11,459,662 B2 | 10/2022 | Murahara |
| 2011/0045971 A1 | 2/2011 | Collier |
| 2012/0302811 A1 | 11/2012 | Long |
| 2014/0044624 A1 | 2/2014 | Ghirelli |
| 2014/0226775 A1 | 8/2014 | DeVolpi |
| 2016/0189806 A1 | 6/2016 | Cheatham |
| 2016/0189816 A1 | 6/2016 | Czerwinski |
| 2016/0196888 A1 | 7/2016 | Spoerke |
| 2017/0084355 A1 | 3/2017 | Scott |
| 2019/0371482 A1 | 12/2019 | Benson |
| 2020/0122109 A1 | 4/2020 | Kruizenga |
| 2022/0223302 A1 | 7/2022 | De Groot |
| 2023/0088516 A1 | 3/2023 | Bailey |
| 2024/0312656 A1 | 9/2024 | Pamplin et al. |
| 2024/0347222 A1 | 10/2024 | Czerwinski |

FOREIGN PATENT DOCUMENTS

| | | |
|---|---|---|
| CN | 101376528 | 3/2009 |
| CN | 101631642 | 1/2010 |
| CN | 203400551 | 1/2014 |
| CN | 109173419 | 1/2019 |
| CN | 108179432 | 9/2019 |
| CN | 110194494 | 9/2019 |
| CN | 109637682 | 9/2020 |
| CN | 113732294 | 12/2021 |
| CN | 113851246 | 12/2021 |
| CN | 113860350 | 12/2021 |
| CN | 112125281 | 2/2022 |
| CN | 112853100 | 7/2022 |
| CN | 111785407 | 8/2022 |
| CN | 112316724 | 11/2022 |
| CN | 112863725 | 12/2022 |
| CN | 112863726 | 12/2022 |
| EP | 0170033 | 5/1986 |
| EP | 4338174 | 3/2024 |
| RU | 2499306 | 11/2013 |
| RU | 215749 | 12/2022 |
| WO | WO 2018/001469 | 1/2018 |
| WO | WO 2018026536 | 2/2018 |
| WO | WO 2018064572 | 4/2018 |
| WO | WO 2019231971 | 1/2020 |

OTHER PUBLICATIONS

U.S. Appl. No. 18/783,094, Pamplin et al., Sep. 24, 2024.
U.S. Appl. No. 18/899,211, Pamplin et al., Sep. 27, 2024.
McDonald. "Challenges of Extracting and Purifying Fission-Produced Molybdenum-99" 3146-3150. Industrial & Engineering Chemistry Research. Jul. 29, 2000.
Rao. "Studies on separation and purification offission 99Mo from neutron activated uranium aluminum alloy" 186-191. Applied Radiation and Isotopes. Jul. 2014; <abstract; p. 187, col. 2, last paragraph; p. 188.
Cheng et al. Molten salt-assisted carbonized zeolite imidazolate framework on nickel foam for highly efficient iodide capture in fluoride molten salts (2023), Chemical Engineering Journal 477, (2023).
Hoyt, N. et al. "Online Monitoring of Molten Salt Reactors," Argonne National Laboratory (2019).
International Search Report and Written Opinion for PCT/US2024/037740, issued Oct. 10, 2024.
Furuichi et al. "Study on behavior of tritium in concrete wall," Journal of nuclear materials 350.3 (2006): 246-253.
H. Zhou, J. R. Long, O. M. Yaghi (2012). "Introduction to Metal-Organic Frameworks." Chemical Re-views. Chem. Rev. 2012, 112, 673-674.
Medha Kasula, Tin Le, Adrienne Thomsen, Milad Rabbani Esfahani (2022). "Silver metal organic frameworks and copper metal organic frameworks immobilized on graphene oxide for enhanced adsorption in water treatment." Chemical Engineering Journal, vol. 439, 2022, 135542, ISSN 1385-8947.
V. Sanderyd (2018). "Novel Hybrid Nanomaterials—Combining Mesoporous Magnesium Carbonate and Metal-Organic Frameworks." UPPSALA Universitet.
Osama Abuzalat et al. (2018). Sonochemical fabrication of Cu(II) and Zn(II) metal-organic framework films on metal substrates, *Ultrasonics Sonochemistry*, vol. 45, 2018, pp. 180-188, ISSN 1350-4177.
Mahboobeh Tanhaei, et al. , (2019), Energy-efficient sonochemical approach for the preparation of na-nohybrid composites from graphene oxide and metal-organic framework, Inorganic Chemistry Communications, vol. 102, 2019, pp. 185-191, ISSN 1387-7003.

METHODS FOR THE PURIFICATION OF MOLYBDENUM-99 WITH PHASE TRANSFER AGENTS

RELATED APPLICATION

The present application relates and claims priority to U.S. Provisional Application No. 63/516,840, filed on Jul. 31, 2023, which is hereby incorporated by reference in its entirety.

TECHNICAL FIELD

The present application relates generally to methods for purification of molybdenum-99 from mixtures with phase transfer agents.

BACKGROUND

The fission of uranium-235 (U-235) produces a spectrum of fission products, including molybdenum-99 (Mo-99), iodine-131 (I-131) and xenon-133 (Xe-133). The decay product of Mo-99, technetium-99m (Tc-99m), is used in at least two-thirds of all diagnostic medical isotope procedures. Tc-99m is used for detection of disease and for the study of organ structure and function. Tc-99m has a half-life of about 6 hours and emits 140 keV photons when it decays to Tc-99, a radioactive isotope with an approximately 214,000-year half-life. This photon energy is useful for detection by scintillation instruments such as gamma cameras, and the data collected by the cameras are analyzed to produce structural and functional images.

Mo-99 is typically produced in uranium-bearing targets by irradiating them with thermal neutrons. Some of the U-235 nuclei absorb these neutrons, which can cause them to fission. The fission of U-235 nucleus produces two but sometimes three lower-mass nuclei referred to as fission fragments. Approximately 6 percent of these fission fragments are Mo-99 atoms. Nuclear reactors provide an efficient source of thermal neutrons for Mo-99 production.

The amount of Mo-99 produced in a target is a function of irradiation time, the thermal neutron fission cross section for U-235, the thermal neutron flux on the target, the mass of U-235 in the target, and the half-life of Mo-99. For typical reactor thermal neutron fluxes on the order of 1014 neutrons per square centimeter per second, irradiation times of about 5 to 7 days are required to achieve near-maximum Mo-99 production in the targets.

After cooling, the targets can be processed in hot cells to recover the Mo-99. Processing is carried out quickly to recover the Mo-99 to minimize further losses from radioactive decay. About 1 percent of the Mo-99 produced in the target is lost to radioactive decay every hour after irradiation.

The apparatus in the hot cell used to process the targets and recover the Mo-99 consists of a container for dissolving the targets, which is connected to tubing and columns for subsequent chemical separations to isolate Mo-99. There are two general approaches for chemically processing targets to recover Mo-99: alkaline dissolution and acidic dissolution.

Alkaline dissolution is generally used for targets that contain aluminum. A sodium hydroxide (NaOH) solution is used to dissolve the entire target, including the aluminum cladding and the uranium/aluminum alloy. Dissolution produces a sodium aluminate ($NaAlO_2$) solution containing sodium molybdate ($Na_2MoO_4$) along with small amounts of fission products and plutonium and a solid oxide/hydrated oxide residue. Hydrogen gas is evolved during dissolution. The solution is recovered by filtering to remove suspended solids, typically purified by ion exchange, and passed through a column of alumina or ion-exchange resin that preferentially adsorbs the molybdate ($MoO_4^{2-}$) ion. Mo-99 recovery yield from the solution typically exceeds 85 to 90 percent. The sorbed molybdate is typically washed with a dilute ammonium hydroxide ($NH_4OH$) solution and then removed from the column using a concentrated saline or ammonium hydroxide solution. Mo-99 is recovered as a highly pure product. The solid residue contains uranium and most of the fission products except the alkali metals, iodine, fission gases, alkaline earths, and the elements that can act as either an acid or base such as molybdenum oxide and aluminum oxide. The short-lived fission gases (e.g., Xe-133) can be collected for sale or stored for decay, and I-131 can also be separated for sale if desired.

Acid dissolution is generally used for uranium metal and uranium oxide targets. In contrast to the alkaline dissolution process, only the uranium metal or oxide is processed; the uranium target is physically separated or leached from the target cladding and then dissolved in nitric acid. A nitrate ($NO_3^-$) solution containing uranium, molybdenum, and all other fission products (except volatile gases such as iodine, Xe-133, krypton-85, and nitrogen oxides) is formed.

Additional purification steps are required to recover highly pure Mo-99 after alkaline dissolution or acidic dissolution. One of the current methods for purifying Mo-99 from the irradiated uranium target containing fission products is the LEU Modified Cintichem Process (LMC). After the acidic dissolution of the irradiated uranium in nitric acid, the LMC process is based on the addition of various carriers to precipitate out fission side products. The process involves various steps to remove contaminants such as radioiodine, iodine, iodate and periodate. Precipitated contaminants are separated out of the solution using filtration, and washed with $HNO_3$ to remove any potentially adsorbed compounds and increase the acidity of the reaction mixture. At this point, the majority of uranium and iodine have been removed; however, additional steps are necessary to remove other fission products.

Mo-99 can be precipitated from the solution with alpha benzoin oxime (ABO), typically in sodium hydroxide (NaOH). In addition to ABO, ruthenium and rhodium carriers are added to prevent ruthenium and rhodium from coprecipitating with Mo when alpha benzoin oxime (ABO) is added, a stable Mo carrier is added to the solution to assist in Mo precipitation during the ABO steps, and potassium permanganate ($KMnO_4$) is added to keep Mo in a state that allows for precipitation with ABO. The ABO-Mo complex is a white precipitate which can be filtered off from the rest of the solution. Dissolution of the ABO-Mo precipitate with NaOH and hydrogen peroxide ($H_2O_2$), followed by elution (e.g. wherein the eluent is about 0.4 M NaOH solution), on at least two chromatography columns (e.g., Ag/C and Ag/C with hydrated zirconium oxide), removes any final impurities.

A particular challenge in purifying Mo-99 is that it decays quickly. As Mo-99 decays, the beta and gamma radiations break the bonds between molybdenum and ABO, which leads to loss of Mo-99 in this purification process. Although ABO is useful for the purification of Mo-99, improvements in the time, resources and energy required to purify Mo-99 are desirable.

There remains a need for methods for the purification of Mo-99 and other fission products from uranium-bearing targets. In particular, there remains a need for purification methods for Mo-99 that are simpler and faster than the purification of Mo-99 with ABO. There also remains a need for methods for the isolation of Mo-99 from molten salt reactors.

SUMMARY OF THE INVENTION

In one example, a method for isolating molybdate from a mixture of fission products is disclosed. In one example, the method includes introducing the mixture of fission products, including a molybdenum compound and a hydroxide source, to a first aqueous solution to produce a fission product aqueous solution. The hydroxide source may react with the fission products to produce fission product salt in the fission product aqueous solution. Additionally, the hydroxide source may react with the molybdenum compound to produce a molybdate salt in the fission product aqueous solution. Then, the organic solution comprising a phase transfer agent (PTA) may be contacted with the fission product aqueous solution. The PTA may be configured to selectively react with the molybdate salt to product a PTA-molybdate complex in the organic solution. Then, the organic solution may be isolated from the fission product aqueous solution. Then, the organic solution may be eluted to isolate the molybdate from the PTA-molybdate complex.

In another example, the PTA may be a compound having a formula of

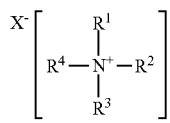

Here, X may be a halide and $R^1$, $R^2$, $R^3$, and $R^4$ may be an alkyl.

In another example, X may be a hydroxide and $R^1$, $R^2$, $R^3$, and $R^4$ may be $C_8$ alkyls.

In another example, the PTA may be a quaternary ammonium compound.

In another example, the quaternary ammonium compound may be tetraoctylammonium bromide.

The example method may further include adjusting a pH of the fission product aqueous solution to about 2.

The example method may further include adding an acid to the fission product aqueous solution prior to contact with the organic solution.

In another example, the hydroxide source may comprise sodium hydroxide.

In another example, the molybdenum compound may be molybdenum hexafluoride.

In another example, the PTA may be configured to extract the molybdate salt from the fission product aqueous solution into the organic solution.

In another example, the PTA may be configured to be reactive with the molybdate salt and nonreactive with other fission products of the fission products.

In another example, the method may further comprise filtering contaminants from the aqueous solution prior to contact with the organic solution.

In another example, the method may further comprise adding a stripping agent to the organic solution.

In one example, A method for isolating molybdenum from a mixture of fission products is disclosed. In this example, the method includes reacting a mixture of fission products, including molybdenum hexafluoride, with an alkali hydroxide compound in a first aqueous solution. In this example, the mixture of fission products reacts with the alkali hydroxide compound to produce fission product salts. In this example, the molybdenum hexafluoride reacts with the alkali hydroxide compound to produce a molybdate salt. The method may further include adjusting a pH of the first aqueous solution by addition of an acid. The method may further include introducing an organic solution comprising a phase transfer agent (PTA) into the first aqueous solution. In this example, the PTA is configured to be reactive with the molybdate salt and be nonreactive with other fission product salts. The method may further include agitating the organic solution and the first aqueous solution. In this example, the molybdate salt reacts with the PTA to produce a PTA-molybdate complex that is dissolved in the organic solution. The method may further include separating the organic solution from the first aqueous solution. The method may further include feeding the organic solution through a column comprising a sorbent configured to absorb the PTA-molybdate complex. The method may further include washing the sorbent with an organic solvent. In this example, the PTA-molybdate complex dissociates upon washing, such that molybdate is eluted off the sorbent. The method may further include collecting the eluted molybdate in a generator.

In another example, the PTA is a compound having a formula of

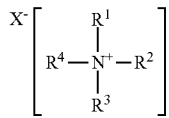

Here, X represents a halide $R^1$, $R^2$, $R^3$, and $R^4$ are selected from a group consisting of a methyl, ethyl, propyl, butyl, pentyl, heptyl, octyl, nonyl, or decyl alkyl.

In another example, X is a hydroxide and $R^1$, $R^2$, $R^3$, and $R^4$ are $C_8$ alkyls.

In another example, a method for isolating molybdenum from a mixture of fission products produced by a molten salt reactor system is disclosed. The method includes producing the mixture of fission products in a molten salt following fission of nuclear fuel in a reactor of the molten salt reactor system. In this example, the mixture of fission products comprises a molybdenum compound. The method further includes circulating the molten salt comprising the mixture of fission products to an extraction system. The method further includes extracting the mixture of fission products from the molten salt. The method further includes after extracting, dissolving the mixture of fission products in an aqueous solution including a hydroxide source. In this example, the molybdenum compound reacts with the hydroxide source to produce a molybdate salt in the aqueous solution. The method further includes introducing an organic solution comprising a phase transfer agent (PTA) to the aqueous solution. In this example, the PTA is configured to selectively react with the molybdate salt to produce a PTA-molybdate compound in the organic solution. The method further includes isolating the organic solution from the aqueous solution. The method further includes eluting the organic solution to isolate molybdate from the PTA-molybdate compound.

In another example, the PTA is a compound having a formula of

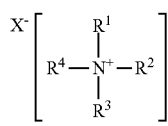

Here, X is a halide and $R^1$, $R^2$, $R^3$, and $R^4$ is an alkyl having a carbon length of $C_1$-$C_{10}$ In another example, X is a hydroxide and $R^1$, $R^2$, $R^3$, and $R^4$ are $C_8$ alkyls.

In another example, a system for isolating molybdenum from a mixture of fission products produced by a molten salt reactor system comprising. The system includes a fuel salt system configured to circulate an irradiated fueled molten salt comprising dissolved fission products through a molten salt loop of the molten salt reactor system including an access vessel, a reactor, and a heat exchanger. The system further includes an extraction system fluidly coupled to the access vessel along the molten salt loop, the extraction system operable to sparge fission products from the irradiated fueled molten salt into a carboy. The system further includes a purification system configured to isolate a molybdenum compound from the mixture of fission products in the carboy comprising. The purification system includes the carboy including the mixture of fission products and a hydroxide source in an aqueous solution. The purification system further includes an organic solution including a phase transfer agent (PTA) configured to selectively react with the molybdenum compound. The purification system further includes a first solution created by combining the aqueous solution of the carboy with the organic solution. In this example, the PTA extracts the molybdenum compound from the mixture of fission products into the organic solution. The purification system further includes a separatory funnel configured to separate the organic solution into an extraction cartridge and the aqueous solution into a waste. In this example, the extraction cartridge is configured to isolate molybdate from the organic solution. The purification system further includes a generator configured to store the molybdate.

In another example, the PTA is a compound having a formula of

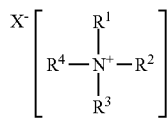

Here, X is a halide and $R^1$, $R^2$, $R^3$, and $R^4$ is an alkyl.

Aspects of this disclosure are directed to methods for separation of Mo-99 compounds from mixtures of other elements. In certain embodiments, the methods are provided for separation of Mo-99 compounds from fission products from fueled molten salt compositions after reaction in a molten salt reactor core.

In one aspect, a method for separation of molybdenum-99 from a mixture of other elements comprises:
(i) combining a mixture of other elements comprising Mo-99 compounds with water and an alkali metal hydroxide compound or alkali metal carbonate compound to form an aqueous component comprising molybdate salts ($M_2$(Mo-99)$O_4$, wherein M is an alkali metal cation) and other elements;
(ii) optionally, adjusting the pH of the aqueous component comprising $M_2$(Mo-99)$O_4$, and other elements with the addition of acid;
(iii) preparing an organic component comprising one or more phase transfer agents and one or more organic solvents; wherein the one or more phase transfer agents are selected from compounds of Formula I or Formula II:

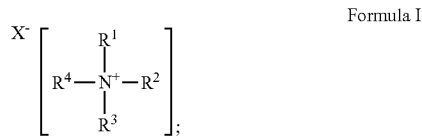

Formula I

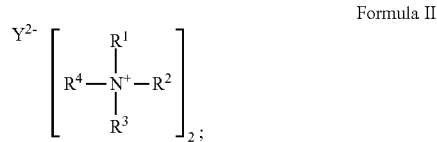

Formula II wherein X is a halide or hydroxide (OH—);
wherein Y is carbonate ($[CO3]^{2-}$);
and wherein each of $R^1$, $R^2$, and $R^3$, is independently selected from $C_1$-$C_{20}$ alkyl and $R^4$ is $C_6$-$C_{20}$ alkyl;
(iv) contacting the aqueous component with the organic component, wherein the molybdate salt ($M_2$(Mo-99)) (4) interacts with the one or more phase transfer agents to form Mo-99 complexes and alkali metal salts, and wherein the Mo-99 complexes are extracted into the organic component;
(v) separating the organic component from the aqueous component, wherein the organic component comprises at least a portion of the Mo-99 complexes; and
(vi) eluting the organic component comprising at least a portion of the Mo-99 complexes on a sorbent to provide an eluite comprising purified molybdate salt ($M_2$(Mo-99)$O_4$).

In another aspect, a method for separation of molybdenum-99 from a mixture of reduced fission products comprises:
(i) combining a mixture of fission products comprising Mo-99 compounds with water and an alkali metal hydroxide compound or alkali metal carbonate compound to form an aqueous component comprising molybdate salts ($M_2$(Mo-99)$O_4$, wherein M is an alkali metal cation) and other fission products;
(ii) optionally, adjusting the pH of the aqueous component comprising $M_2$(Mo-99)$O_4$, and other fission products with the addition of acid;
(iii) preparing an organic component comprising one or more phase transfer agents and one or more organic solvents; wherein the one or more phase transfer agents are selected from compounds of Formula I or Formula II:
Formula I or Formula II:

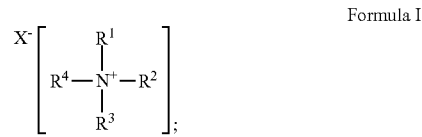

Formula I

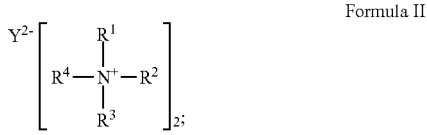

Formula II wherein X is a halide or hydroxide (OH—);
wherein Y is carbonate ($[CO_3]^{2-}$);
and wherein each of $R^1$, $R^2$, and $R^3$, is independently selected from $C_1$-$C_{20}$ alkyl and and $R^4$ is $C_6$-$C_{20}$ alkyl;

(iv) contacting the aqueous component with the organic component, wherein the molybdate salt ($M_2$(Mo-99)$O_4$) interacts with the one or more phase transfer agents to form Mo-99 complexes and alkali metal salts, and wherein the Mo-99 complexes are extracted into the organic component;

(v) separating the organic component from the aqueous component, wherein the organic component comprises at least a portion of the Mo-99 complexes; and (vi) eluting the organic component comprising at least a portion of the Mo-99 complexes on a sorbent to provide an eluite comprising purified molybdate salt ($M_2$(Mo-99)$O_4$).

DESCRIPTION OF THE INVENTION

Figure 1:
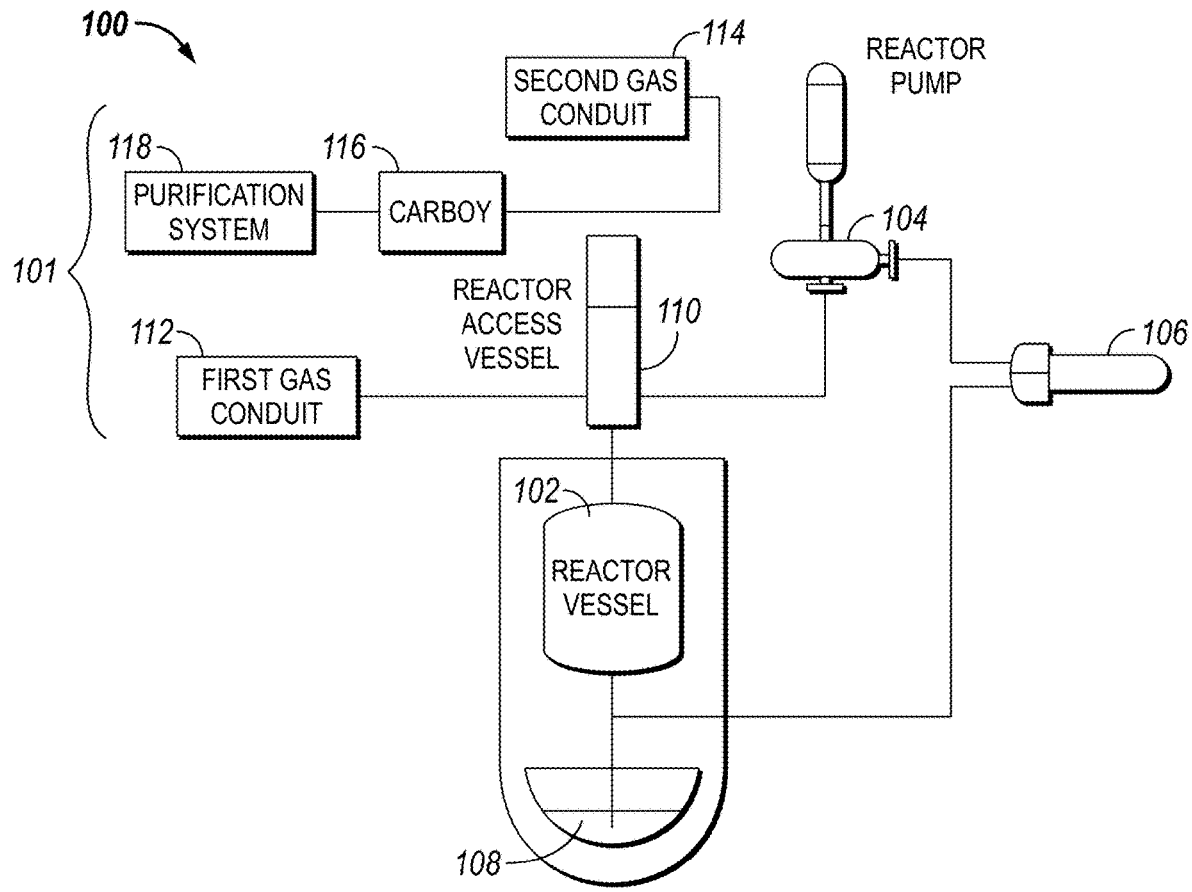
FIG. 1 illustrates a schematic representation of an example molten salt reactor system.

The description that follows includes example systems, methods, and apparatuses that embody various elements of the present disclosure. However, it should be understood that the described disclosure may be practiced in a variety of forms in addition to those described herein.

Uranium atoms (e.g., U-235) in the fueled molten salt composition may undergo fission in the reactor core of a molten salt reactor (MSR) to yield fission products which may be present in the irradiated fueled molten salt composition. Such fission products may include isotopes, such as molybdenum-99 (Mo-99), actinium-225 (Ac-225), iodine-131 (I-131) and xenon-133 (Xe-133), among many other such isotopes. Other isotopes within the molten salt reactor are created by neutron bombardment, and still other isotopes within the molten salt reactor are created by decay. These isotopes (isotopes created directly by fission, by neutron bombardment, or by decay) are collectively referred to herein as fission products or fission fragments. The fueled molten salt containing these fission products may be carried through the MSR system by a molten salt loop, conduit, or series of tubing or piping connecting the components of the MSR system together (e.g., reactor vessel, heat exchanger, reactor access vessel, fuel pump, drain tank, etc.).

A fission product of particular importance is molybdenum-99 (sometimes referred to as Mo-99 or moly-99). Mo-99 is a unique isotope of molybdenum that gives birth to technetium-99m (Tc-99m) through beta decay. Tc-99m is a nuclear isomer used in nuclear medicine in tens of millions of medical diagnostic procedures annually. Importantly, Tc-99m has a relatively short half-life of about 6 hours while Mo-99 has a half-life of about 66 hours. Thus, it is advantageous to collect and store Mo-99 and allow it to decay into Tc-99m following arrival to its intended destination.

The present disclosure describes systems and methods for first extracting a mixture of fission products from a molten salt reactor (MSR) system, and purifying that mixture to isolate molybdenum-99, such that it may be added to a generator for processing into technetium-99m.

The present invention may utilize an extraction system fluidly connected to an MSR system to extract a mixture of fission products from the molten fuel salt of the MSR system. In several embodiments, the present invention may utilize the systems, apparatuses, and methods described in U.S. patent application Ser. No. 18/663,976 filed May 14, 2024, which is hereby incorporated by reference in its entirety. However, one of ordinary skill in the art will appreciate that the purification processes described herein may follow any number of extraction processes and that the extraction systems described should not be viewed as limited, but as exemplary.

Fission products may be present in the molten salt in a gaseous phase. These gaseous fission products may be found dissolved in the molten salt following nuclear fission within the reactor of the MSR. For example, fission may produce molybdenum-99 cations, which may react with fluorine anions in the molten salt to produce molybdenum hexafluoride (MoF$_6$). Other examples include technetium hexafluoride (TcF$_6$), iodine pentafluoride (IF$_5$), antimony pentafluoride (SbF$_5$), among others. MoF$_6$ has a boiling point of about 34° C., so it will be in a gaseous phase within the molten salt loop (having an operating temperature between 600° C. and 700° C.). However, the MoF$_6$ (and other gaseous fission products) is likely to be found dissolved in the molten salt. There may be a number of reasons to extract fission products from the molten salt of an MSR system. Nonetheless, gaseous fission products are worthy of extraction for their independent value (e.g., Mo-99).

The fission product extraction system may include an extraction assembly coupled to a vessel of the molten salt reactor system designed to capture gaseous fission products by dislodging them from the molten salt. The extraction assembly may generally include a sparging apparatus or diffuser, a gas transfer assembly, and a purification system. The various extraction assemblies disclosed herein may be fluidly connected to a vessel of the MSR system, such as an access vessel, glovebox, or hot cell. The extraction assemblies may include a first gas conduit connected to the vessel configured in a manner to sparge the molten fuel salt with an inert gas (such as, but not limited to, helium gas) to dislodge gaseous fission products from the molten fuel salt. The extraction assembly may sometimes be referred to as the extraction system. The vessel may be fluidly connected to a gas transfer assembly connected to a top side of the access vessel by an outlet connecting an internal volume of the access vessel to an internal volume of the gas transfer assembly, so that the gaseous fission products flow through an off-gas outlet into the gas transfer assembly upon dislodgement. The gas transfer assembly may be further fluidly connected to a carboy and include a second gas conduit to facilitate deposition of the dislodged gaseous fission products into a solution of the carboy, where they are redissolved for purification. Additionally, the second gas conduit may be configured to feed a gas through the gas transfer assembly to direct the dislodged fission products towards the carboy. The gas transfer assembly may be equipped with means to discourage or prevent deposition of dislodged fission products onto the piping of the gas transfer assembly, such as piping heaters or inclusion of a halogenating agent in the gas of the second gas conduit. Finally, the gas transfer assembly may be fluidly connected to and facilitate transfer of the dislodged fission products to a purification system, where certain fission products may be isolated from others. Thus, the present invention may be operable to reduce or eliminate fission product build up and may facilitate capture of valuable isotopes produced by nuclear fission.

Following extraction, the mixture of fission products (i.e., those dissolved in the carboy) may be purified to isolate molybdenum-99 from the mixture, such that a pure sample may be input into a generator. Methods for separation of molybdenum-99 from a mixture of other elements or a mixture of fission products, such as those formed in an irradiated fueled molten salt composition, with phase transfer agents (PTA) (alternatively, "phase transfer catalysts") are disclosed herein. For clarity, separation of molybdenum-99 from a mixture of fission products may be synonymous with isolating the molybdenum-99 or purifying the molybdenum-99, as used herein. The exemplary phase transfer agents interact with the molybdenum to facilitate the transfer of molybdenum from an aqueous phase to an organic phase. The complex formed by the molybdenum and phase transfer agent is subsequently eluted on a sorbent to remove the phase transfer agent and provide Mo-99 as a molybdate salt, which may then be added to a generator. Advantageously, by utilizing a PTA to isolate Mo-99 from a mixture of fission products, the purification process is shorted, and the yield is increased.

The method for isolating molybdenum-99 from the mixture of fission products may generally include a plurality of steps. Initially, the mixture of fission products (e.g., those extracted using a sparging apparatus) may be added with a hydroxide source (e.g., alkali metal hydroxide) to an aqueous solution (e.g., deionized water). This may cause the fission products of the mixture of fission products to react with the hydroxide source (e.g., sodium hydroxide) to produce fission product salts and sodium molybdate. Next, an organic solution with a PTA may be prepared. For example, Tetraoctylammonium bromide (TOAB) may be added to a dimethylacetamide (DMA) solution. Next, the aqueous solution, containing the fission product salt, and the organic solution, containing the PTA, may be combined and mixed. For example, the combination may be agitated by sonication. The PTA may be configured to react with the molybdate and be nonreactive with the remaining fission product salts. Upon reaction with the PTA, the molybdate may then transfer from the aqueous solution into the organic solution. Following reaction, the combined mixture may be added to a separatory funnel where the aqueous solution and organic solution, now including the molybdate (i.e., Mo-99), may dissociate and create two distinct layers, which are then separated by the separatory funnel. The aqueous layer may be separated into a waste or separate vessel for further processing. The organic layer may be input into an extraction cartridge to remove the PTA from the molybdate salt, which then may be eluted into a generator. The PTA may take many forms. For example, the PTA described herein may generally be compounds of Formula I or Formula II:

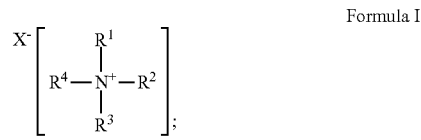

Formula I

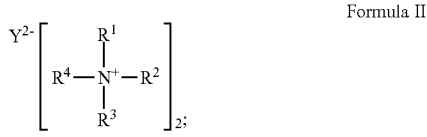

Formula II

In these formulas, X may be or represent a halide (e.g., a bromine ion, chlorine ion, etc.) or hydroxide (OH). Additionally, Y may be or represent carbonate ([CO$_3$]$^{2-}$). Each of R$^1$, R$^2$, R$^3$, and R$^4$, may be an alkyl of varying lengths. For example, a C$_1$-C$_{20}$ alkyl. The alkyl groups may be straight or branched. In several embodiments, R$^1$, R$^2$, R$^3$, and R$^4$ are C$_8$ alkyls (i.e., octane). R$^1$, R$^2$, R$^3$, and R$^4$ may be the same.

Exemplary phase transfer agents include but are not limited to tetrahexylammonium bromide, tetrahexylammonium chloride, tetraheptylammonium bromide, tetraheptylammonium chloride, tetraoctylammonium bromide, tetraoctylammonium chloride, tetranonylammonium bromide, tetranonylammonium chloride, tetradecylammonium bromide, tetradecylammonium chloride, hexadecyltrimethylammonium bromide, and hexadecyltrimethylammonium chloride.

The phase transfer agent may be cetyltrimethylammonium bromide [(C$_{16}$H$_{33}$)N(CH$_3$)$_3$]Br].

Turning now to the Drawings, FIG. 1 illustrates a schematic representation of an example molten salt reactor system 100. The molten salt reactor system 100 may implement and include the fission product extraction system and implement any of the functionalities of each described herein. As will be understood and appreciated, the example shown in FIG. 1 represents merely one example configuration of a molten salt reactor system 100 in which extraction systems may be used to extract a mixture of fission products to be purified using the processes described herein. It will be understood that the MSR system 100 illustrated in FIG. 1 may be used in and with substantially any other configuration of the molten salt reactor, as contemplated herein.

In various embodiments, a molten salt reactor system 100 utilizes fuel salt enriched with uranium (e.g., high-assay low-enriched uranium) to create thermal power via nuclear fission reactions. The uranium in the molten salt may be uranium-235 or uranium-233. In another embodiment, the molten salt reactor 100 may be a breeder reactor that utilizes thorium-232 as a starting material, in which the thorium-232 undergoes transmutation into uranium-233, which undergoes the nuclear fission reactions. In at least one embodiment, the composition of the fuel salt may be $LiF$—$BeF_2$—$UF_4$, though other compositions of fuel salts may be utilized as fuel salts within the reactor system 100. The fuel salt within the system 100 is heated to high temperatures (about 700° C.) and melts as the system 100 is heated, such that the fuel ($UF_4$) is dissolved in the molten salt. In several embodiments, the molten salt reactor system 100 includes a reactor vessel 102 where the nuclear fission reactions occur within the molten fuel salt, a fuel salt pump 104 that pumps the molten fuel salt to a heat exchanger 106, such that the molten fuel salt re-enters the reactor vessel 102 after flowing through the heat exchanger 106, and piping in between each component. Fission reaction within the reactor vessel 102 may produce a wide variety of fission products. These fission products are not limited to those produced in single-step reactions between fuel (e.g., U-235) and neutrons, but may also arise from decay of short-lived direct fission products. Fission products may include compounds containing molybdenum-99, actinium-225, iodine-131, iodine-123, iodine-125, xenon-133, hydrogen-3, nitrogen-13, carbon-14, oxygen-15, fluorine-18, gallium-67, gallium-68, selenium-75, krypton-81m, strontium-89, strontium-90, yttrium-90, technetium-99m, indium-111, samarium-153, erbium-169, actinium-225, and radium-223. One of ordinary skill in the art will understand and appreciate that a wide variety of fission products may be produced within the reactor vessel 102 and that these fission products are known.

The molten salt reactor system 100 may also include additional components, such as, but not limited to, a drain tank 108, a heat exchanger 106, a reactor pump 104, and a reactor access vessel 110. The drain tank 108 may be configured to store the fuel salt once the fuel salt is in the reactor system 100 but in a subcritical state, and also acts as storage for the fuel salt if power is lost in the system 100. The reactor access vessel 110 may be configured to allow for introduction of small pellets of uranium fluoride ($UF_4$) and/or Beryllium (Be) to the system 100 as necessary, in which the pellets dissolve within the molten salt and bring the reactor to a critical state, compensate for depletion of fissile material, and/or manage fuel salt chemistry.

Additionally, the molten salt reactor system 100 may include or be fluidly connected to a fission product extraction system 101 including a purification system 118, a first gas conduit 112, a second gas conduit 114, and a carboy 116. The fission product extraction system 101 may comprise an extraction assembly configured to be integrated into a molten salt reactor system 100 to extract fission products found therein. The extraction assembly may include a purification system 118, a first gas conduit 112, a second gas conduit 114, and a carboy 116. The first gas conduit 112, may be a sparging apparatus and be generally operable to sparge the contents of the reactor access vessel 110 with an inert gas or nonreactive gas. The second gas conduit 114 may be generally operable to facilitate transfer of the dislodged or sparged fission products to the carboy 116. The carboy 116 may be generally operable to receive the dislodged fission products and dissolved them within a liquid solution contained within a volume of the carboy 116. The carboy 116 may be fluidly connected to a purification system 118. The purification system 118 may be generally operable to purify the solution of the carboy 116 following fission product capture. The purification system 118 may facilitate isolation of specific fission products captured by the extraction system. The purification system 118 may be operable to facilitate the steps of the processes described herein.

Figure 2:
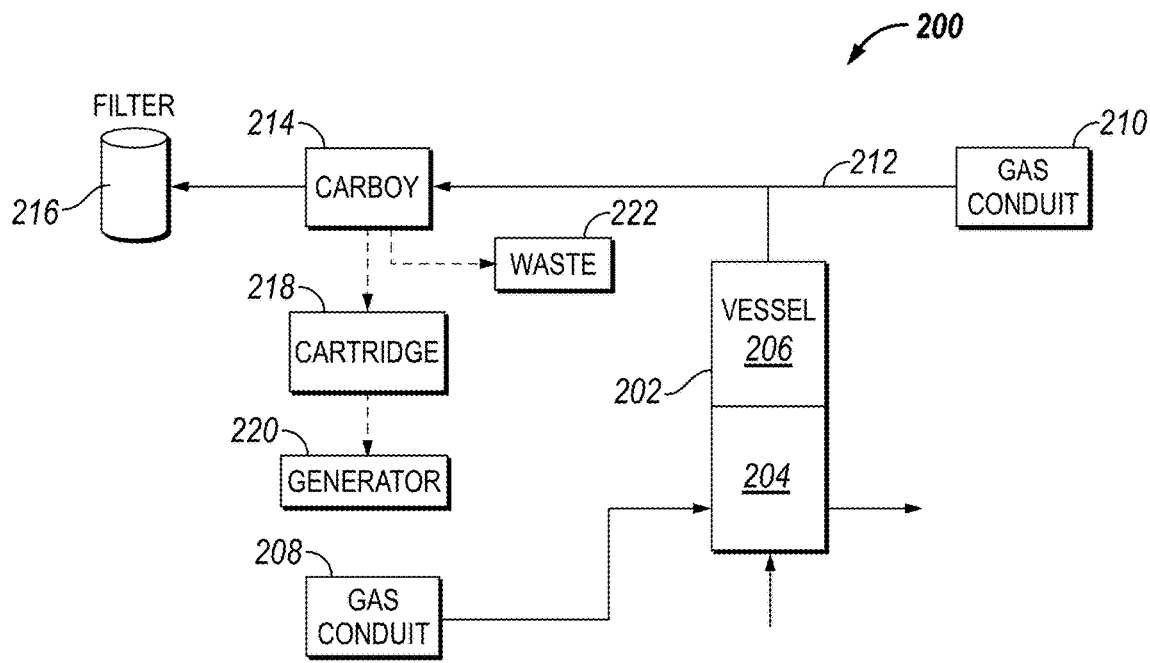
FIG. 2 illustrates a schematic representation of an example fission product extraction system.

Turning now to FIG. 2, an example extraction system 200 is shown. The extraction system 200, may be substantially analogous to the extraction system 101 in that it is configured to extract fission products dissolved in molten salt of a molten salt reactor system (e.g., molten salt reactor system 100). In many embodiments, the vessel 202 may be a reactor access vessel (e.g., reactor access vessel 110), a drain tank (e.g., drain tank 108), a glovebox, a hot cell, or any other component or vessel of a molten salt reactor system. In one embodiment, the vessel 202 is a glovebox or hot cell separated from the MSR system but fluidly connected to the molten salt loop (as indicated by the arrows connected to the vessel 202). The vessel 202 may be generally coupled with or a part of the molten salt loop of a MSR system and may receive a flow of irradiated fueled molten salt. In many embodiments, the vessel 202 is downstream of the reactor vessel (e.g., reactor vessel 102) of the MSR system, such that the molten salt flowing thereto is irradiated and comprises fission products (e.g., molybdenum hexafluoride). Therefore, the vessel 202 may generally include a molten salt phase 204 and a gaseous phase 206.

The vessel 202 may be fluidly connected to a first gas conduit 208 through piping or tubing operable to sparge the vessel 202 of dissolved gasses. The connection may generally be such that the first gas conduit 208 is operable to feed a gas into a volume of the vessel 202. In many embodiments, the first gas conduit 208 feeds an inert gas into the liquid or molten phase 204 of the vessel 202. The gas emitted by the first gas conduit 208 may be generally configured as to not react with the contents of the molten salt of the liquid phase 204. For example, the gas from the first gas conduit may be an inert gas, such as helium gas, neon gas, argon gas, xenon gas, radon gas, krypton gas, nitrogen gas, carbon dioxide, or other nonreactive gasses known in the art.

The first gas conduit 208 may feed the inert gas into the vessel 202 and sparge the molten salt contained therein to dislodge dissolved fission products within the molten salt (e.g., molybdenum hexafluoride). By feeding a nonreactive gas into the liquid phase 204 of the vessel 202, the molten salt is agitated by contact with the sparging gas. This agitation causes dissolved fission products to dislodge from the molten salt and into the gaseous phase 206 of the vessel 202. For example, the first gas conduit 208 may be a gas flushing apparatus operable to degas the molten salt. Thus, dislodging fission products from the irradiated fueled molten salt and facilitating the initial step for fission product capture.

The vessel 202 may be fluidly connected to a gas transfer assembly 112 that comprises piping connecting the vessel 202 to a second gas conduit 210 and a carboy 214. The second gas conduit 210 may be generally operable to feed a gas through the gas transfers assembly 212 to facilitate transfer of the dislodged fission products to the carboy 214. The piping of the gas transfer assembly 212 may be connected to a portion of the vessel 206 containing the gaseous phase 206 through an outlet positioned at a top side of the vessel 202. The dislodged fission products, following sparging by the first gas conduit, may be present in the gaseous phase 206 and ascend into piping of the gas transfer assembly 212. The second gas conduit 210 feeds a gas into the gas transfer assembly in the direction of the carboy 214, such that the dislodged fission products are transferred from the gaseous phase 206 of the vessel 202 to the carboy 214.

In several embodiments, the gas emitted by the second gas conduit 210 contains a halogenating agent in an inert gas solution. For example, the gas emitted may comprise nitrogen trifluoride in an argon solution. Advantageously, by inclusion of the halogenating agent in the gas of the second gas conduit 210, not only are the dislodged fission products directed towards the carboy 214, but any gaseous fission products that have deposited onto the piping of the gas transfer assembly 212 may be halogenated. For example, molybdenum hexafluoride may deposit onto a metal surface of the system, resulting in metallic molybdenum and fluorine gas. The metallic molybdenum may then react with the halogenating agent (e.g., nitrogen trifluoride) and be reconverted into gaseous molybdenum hexafluoride, thus resulting in capture.

In some embodiments, the piping of the gas transfer assembly 212 is equipped with a heating system. The heating system may comprise at least one heated wrap or external heater operable to heat the internal surface of the piping. Advantageously, by inclusion of the heating system, dislodged fission products are discouraged or prevented from depositing onto the surface of the piping.

The gas transfer assembly 212 may be fluidly connected to a carboy 214 configured to receive the dislodged fission products. The carboy 214 may be filled with a liquid solution configured to facilitate dissolution of the dislodged fission products. The gas transfer assembly 212 may include piping that extends into a volume of the carboy 214, such that as the dislodged fission products are transferred into the liquid solution of the carboy 214. Fission products transferred to the carboy 214 may include but are not limited to molybdenum hexafluoride ($MoF_6$), technetium hexafluoride ($TcF_6$), iodine pentafluoride ($IF_5$), and antimony pentafluoride ($SbF_5$). In some embodiments, the carboy 220 may include an aqueous solution with an alkaline medium (such as, but not limited to, sodium hydroxide, potassium hydroxide, lithium hydroxide, calcium hydroxide, and other similar alkaline mediums). The aqueous solution may facilitate the processing and purification of the fission products. The aqueous solution is configured such that the alkaline medium therein reacts with the fission products to facilitate their capture by causing them to be dissolved into the aqueous solution. For example, molybdenum hexafluoride may react with sodium hydroxide and water to produce sodium molybdate. This example may follow the reaction below.

$$MoF_6 + 8NaOH \rightarrow Na_2MoO_4 + 6NaF + 4H_2O$$

However, one of ordinary skill in the art will appreciate that molybdenum complexes will not be the only fission product captured by the extraction system, and subsequently dissolved in the solution of the carboy 214. Rather, one of ordinary skill in the art will appreciate that molybdenum will be one of many fission products captured by the extraction system and subsequently dissolved in the solution of the carboy 214. For example, technetium hexafluoride, iodine pentafluoride, antimony pentafluoride, xenon complexes, niobium pentafluoride, ruthenium hexafluoride, ruthenium tetroxide, and other fission product complexes may be dislodged and subsequently captured. Advantageously, the fission products captured by the extraction system may include isotopes of interest, such as molybdenum-99, iodine-131, strontium-90, and actinium-225.

In several embodiments, the carboy 214 may be fluidly connected to a charcoal trap or charcoal filter 216 configured to capture any gases not dissolved by the carboy 214. Due to the nature of the system, several different gases may make their way to the carboy 214. Consequently, not all gases transferred to the carboy 214 will be reactive with the solution therein and may persist in their gaseous form. The present invention anticipates this consequence and provides means to capture such gases (e.g., the charcoal filter 216). The charcoal filter 216 may be positioned on a top portion of the carboy 214, such that gas not dissolved therein ascends to the charcoal filter 216 where it may be captured.

The carboy 214 may be a component of the purification system, which may further include an extraction cartridge 218, a generator 220, and a waste container 222. Generally, the carboy 214 may be configured to pass the solution containing the dissolved fission products (i.e., alkaline solution containing fission product complexes, such as molybdate) to another vessel for inclusion of the organic solution containing the PTA. In some embodiments, the carboy 214 may be the vessel to which the organic solution containing the PTA is added to, such that the PTA may react with molybdenum compounds extracted by the extraction system 200.

Upon addition of the organic solution containing the PTA, the PTA selectively reacts with the molybdate to create a PTA-molybdate complex. The PTA may be configured to be unreactive with certain fission products while being reactive with other fission products. For example, the PTA may only react with the molybdate species (e.g., sodium molybdate) and may not react with the remaining fission products. Upon reaction with the PTA, the molybdate species may migrate from the aqueous layer to the organic layer. In several embodiments, an acid source (e.g., hydrochloric acid) may be added to the vessel or carboy 214 prior to the inclusion of the organic solution to aid in the reaction between the molybdate species and the PTA. In several embodiments, the carboy 214 is removable from the extraction system 200, such that the captured fission products may be removed from the MSR system to be proceed in accordance with the purification methods and systems described herein.

The carboy 214 may be fluidly coupled to a separatory funnel to facilitate separation of an aqueous layer and an organic layer following combination. Upon passing of the mixture of organic and aqueous solutions from the carboy 214 to the separatory funnel, given the different densities of the solutions, separation may occur. The separatory funnel may then transfer the aqueous solution (containing the mixture of unselected fission products) to the waste 222. The waste 222 may be disposed of or further processed to isolate fission products contained therein. The separatory funnel may then transfer the organic solution into a separate vessel or directly to the cartridge 218. The cartridge 218 may be an extraction cartridge configured to separate the molybdate from the PTA-molybdate complex, such that filtrate includes the molybdate. The filtrate may then be input into a generator 220, which may be a technetium-99m generator configured to allow the molybdate (including molybdenum-99) to decay into pertechnetate (including technetium-99m). Advantageously, the purification system 200 is operable to produce a generator ready sample.

Figure 3:
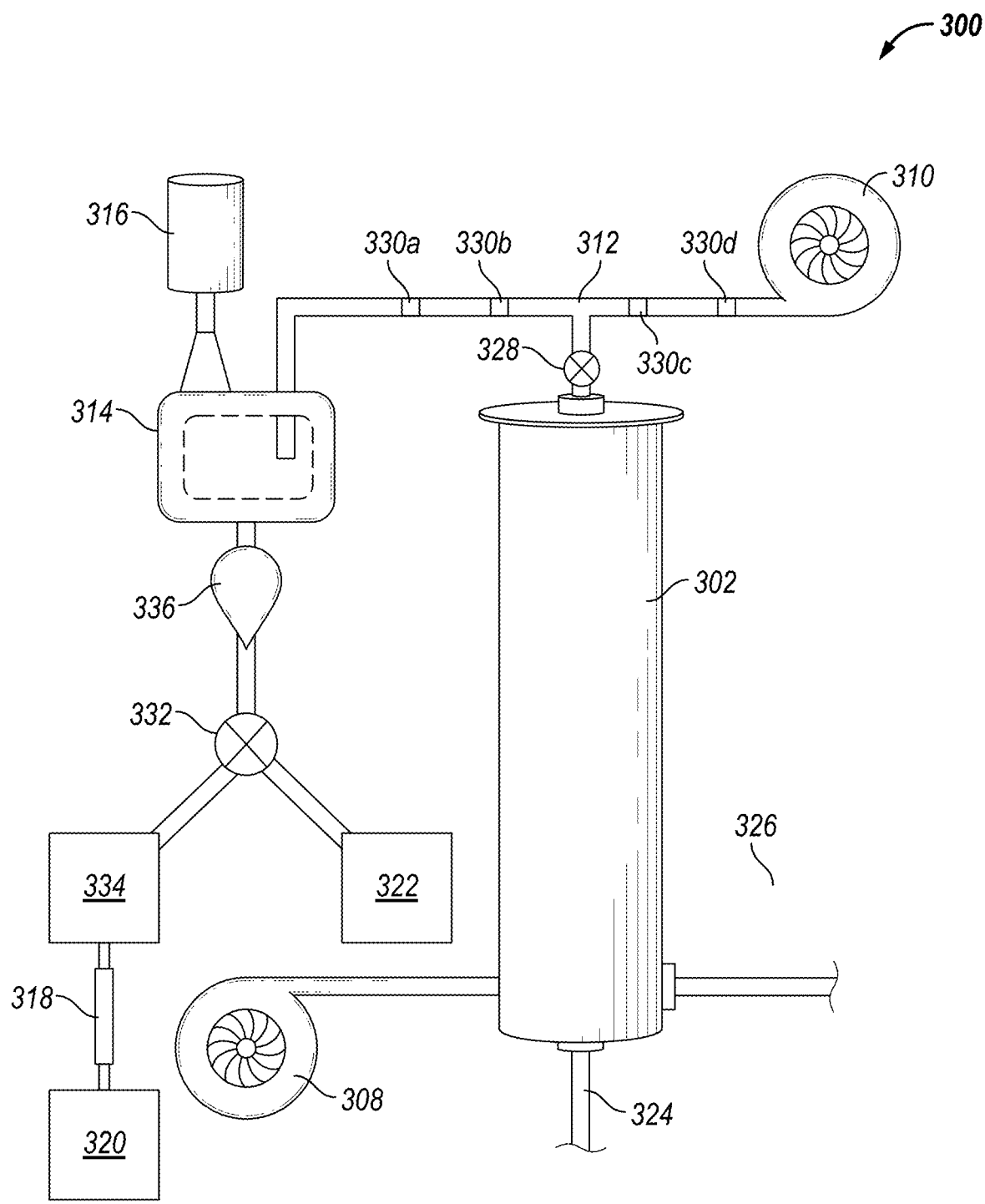
FIG. 3 illustrates an example fission product extraction system including a gas transfer assembly and purification system.

Turning now to FIG. 3, which illustrates an example fission product extraction assembly 300. The example fission product extraction assembly 300 of FIG. 3 may be substantially analogous to the example fission product extraction system 200 of FIG. 2 and be fluidly connected to a vessel 302, and include a first gas conduit 308, a second gas conduit 310, a gas transfer assembly 312, a carboy 314, a charcoal filter 316, an extraction cartridge 318, a generator 320, and a waste container 322.

However, FIG. 3 highlights other components of the example fission product extraction assembly 300 that may be included for its implementation into an MSR system. For example, the vessel 302 may be fluidly connected to a molten salt loop of an MSR system through an inlet pipe 324 and outlet pipe 326 configured to facilitate flow of fueled molten salt into and out of the vessel 302. The gas transfer assembly 312 may include a valve 328 configured to selectively connect a volume of the gas transfer assembly 312 to the volume of the vessel 302.

The molten salt inlet pipe 324 may be a pipe on a fuel salt loop (e.g., system 100), whereby molten fuel salt with fission products present flows into the vessel 302. The molten salt outlet pipe 326 may also be a pipe on the fuel salt loop (e.g., system 100), whereby molten fuel salt with a lesser amount of fission products present, flows out of the vessel 302.

In many embodiments, the first gas conduit 308 is connected to the vessel 302, such that inert gas may be pumped from an inert gas supply (IG) into the molten salt phase of the vessel 302. As an example, the first gas conduit 308 may include a pipe protruding into the vessel 302 by some distance such that the inert gas is inserted into the molten salt phase proximate to the middle of the vessel 302. The gas transfer assembly 312 may be connected at the top of the vessel 302.

The carboy 314 may include a solution of water with an alkaline medium (e.g., sodium hydroxide, potassium hydroxide, lithium hydroxide, calcium hydroxide, and other similar alkaline mediums), such that the resulting aqueous solution has a basic pH level. As the $MoF_6$ gas is bubbled through the aqueous solution, it reacts to form sodium molybdate. The molybdate is dissolved in the aqueous solution. Acid may be added to the carboy 314 to decrease the pH.

The vessel 302 may be fully enclosed, other than the inlet pipe 324, first gas conduit 308, outlet pipe 326, gas transfer assembly 312, but may also have additional openings and piping inlets and outlets, for other applications within the molten salt reactor system. The vessel 302 may be made of stainless steel or other similar metals and metal alloys that can withstand the internal heat and radiation levels within the molten salt reactor system. The molten salt inlet pipe 324, molten salt outlet pipe 326, first gas conduit 308, and gas transfer assembly 312 may also be made out of stainless steel or other similar materials, and, in some embodiments, may also be coated with a nickel alloy. The molten salt inlet pipe 324, molten salt outlet pipe 326, first gas conduit 308, and gas transfer assembly 312 may be connected to the vessel 302 via welding, connection ports, or other known connection methods. Each of the molten salt inlet pipe 324, molten salt outlet pipe 326, first gas conduit 308, and gas transfer assembly 312 may also have a separate valve or series of valves, such that each of the pipes may be closed or opened, either manually or remotely.

The present invention contemplates several sparging apparatuses connected to the first gas conduit configured to facilitate sparging of the vessel. Generally, the sparging apparatus may include a porous member where inert gas from the first gas conduit is fed into the vessel.

The gas transfer assembly 312 may be fluidly connected to a second gas conduit 310 operable to facilitate transfer of the dislodged fission products to the carboy 314 by feeding a gas therein. The second gas conduit 310 may feed the gas in the direction of the carboy, such that as dislodged fission products ascend into the volume of the gas transfer assembly 312, then are pushed to the carboy 314. The gas transfer assembly 312 may be equipped with means to prevent or dissuade fission products from depositing onto a surface of the piping. For example, the gas transfer assembly 312 may include a heating system including a plurality of heaters 330a, 330b, 330c, 330d configured to heat a surface of the piping of the gas transfer assembly. As another example, the gas emitted by the second gas conduit 310 may include a halogenating agent, such as nitrogen trifluoride. Advantageously, the halogenating agent may be included to react with any deposited fission products, such that they are reconverted into a gaseous phase.

The piping of the gas transfer assembly 312, may substantially extend into a volume of the carboy 314, as illustrated by the semi-transparent view of the carboy 314 of FIG. 3. Advantageously, this encourages the dislodged fission products to dissolve into the solution of the carboy 314 as they make contact with the liquid solution therein. The carboy 314 may be fluidly connected to a charcoal filter 316, such that any undissolved gasses are captured therein.

At this point, the carboy 314 may include a variety of fission products captured by the fission product extraction assembly 300. Notably, molybdenum hexafluoride including molybdenum-99 isotopes may be present in the carboy 314. In several embodiments, the captured fission products dissolve in the carboy 314 by reacting with a hydroxide source or an alkaline metal hydroxide. (e.g., sodium hydroxide or potassium hydroxide). Reaction may produce a variety of fission product salts, such as sodium molybdate. Furthermore, an acid may be added to the carboy 314 to dissociate the fission product salts into distinct ions, such as molybdate.

Upon dissolvement into the carboy 314, the fission products may undergo purification by the purification system, which may include the carboy 314, extraction cartridge 318, generator 320, a separatory funnel 336, a three-way valve 332, an organic solution vessel 334, and waste container 322. However, in several embodiments the purification system may be separate from the extraction system 300. In these embodiments, the carboy 314 is detachable from the gas transfer assembly 312 and may be removed for processing at an offsite location. The purification system, including the processes described herein, may occur following extraction of fission products by the example fission product extraction systems (e.g., extraction system 300). Advantageously, the purification system and process steps may begin with the carboy 314 and may isolate molybdenum compounds from the mixture of fission products dissolved in the carboy 314.

The carboy 314 may include an input configured so an operator (or automatic system) may input the organic solution containing the PTA into the carboy 314. In some embodiments, the carboy 314 may be removed and the contents therein (i.e., mixture of fission products in an alkaline solution) may be input into a separate vessel offsite, which may then have the organic solution containing the PTA added thereto to facilitate the purification steps described herein.

Upon addition of the PTA to the carboy 314, the PTA may selectively react with all or a substantial amount of molybdenum compounds (e.g., molybdate) within the carboy 314. As discussed herein, reaction of molybdenum compounds with the PTA creates a molybdenum-PTA complex (e.g., molybdate-TOAB complex) and causes the molybdenum compound to transfer from the aqueous solution to the organic solution. The resulting mixture may flow to a separatory funnel 336, where the aqueous solution and organic solution form two distinct layers. The separatory funnel 336 may then be configured to separate the two distinct layers and, with the aid of the three-way valve 332 and piping, disperse the aqueous layer into the waste 322 and the organic layer into the organic solution vessel 334. The aqueous solution in the waste 322 may include a mixture of fission products in salt form and may be disposed of or further processed. The organic solution in the organic solution vessel 334 may include the PTA-molybdenum complex in an organic solution (e.g., DMA or DCM). The vessel 334 may be fluidly connected to an extraction cartridge 318 (e.g., a solid-phase extraction cartridge) configured to separate the PTA and the molybdenum compound, such that the molybdenum may be input into the generator 320 for transport and storage.

Figure 4:
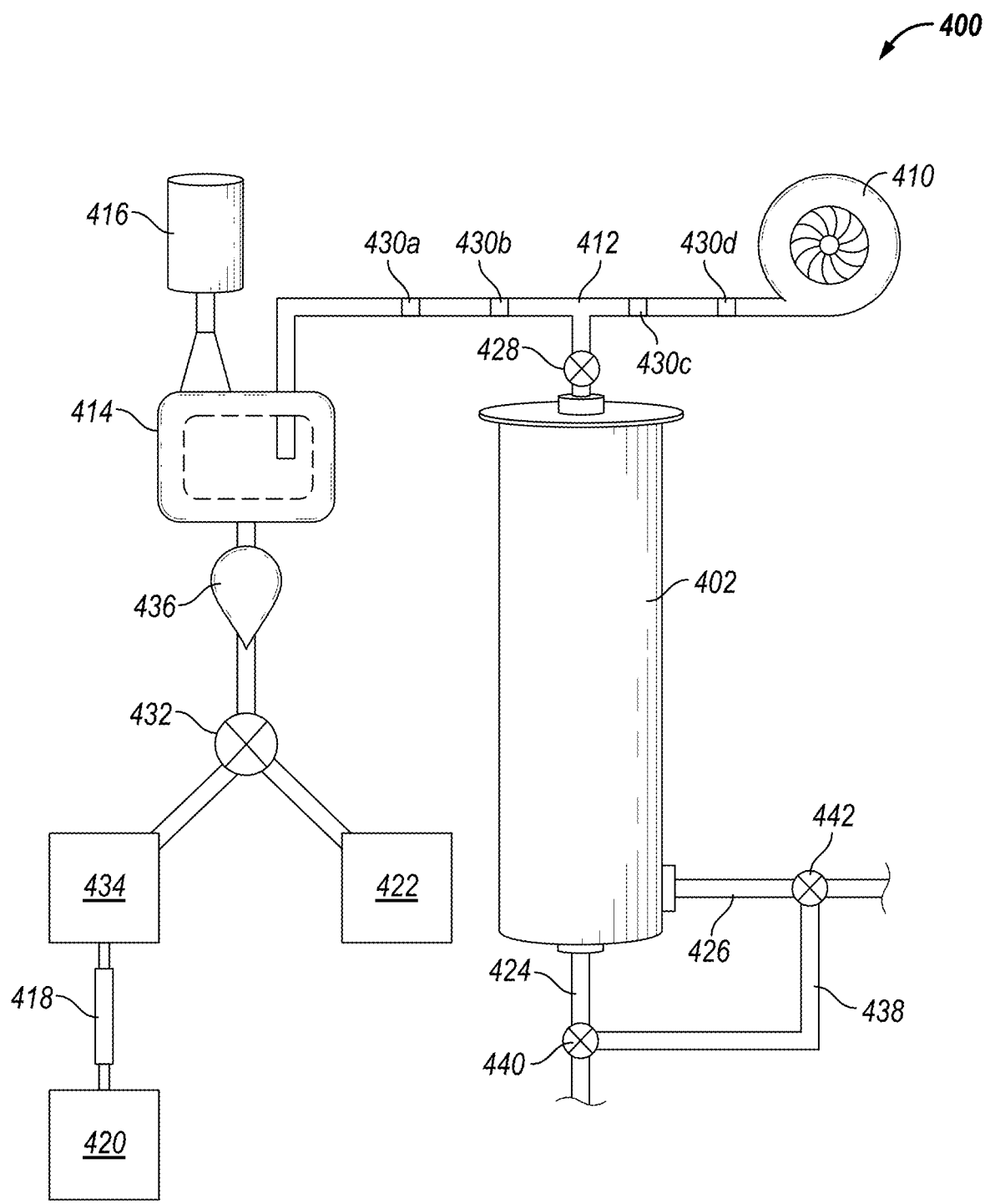
FIG. 4 illustrates another example fission product extraction system including a gas transfer assembly and purification system.

Turning now to FIG. 4, which illustrates an example fission product extraction assembly 400. The example fission product extraction assembly 400 of FIG. 4 may be substantially analogous to that of FIG. 3 and be fluidly connected to a vessel 402, and include a second gas conduit 410, a gas transfer assembly 412, a carboy 414, a charcoal filter 416, an extraction cartridge 418, a generator 420, a waste container 422, a molten salt inlet pipe 424, a molten salt outlet pipe 426, a gas transfer assembly valve 428, the organic solution vessel 434, the separatory funnel 436, the three-way valve 432, and a plurality of heaters 430a, 430b, 430c, 430d. However, the example fission product extraction assembly 400 of FIG. 4 includes an extraction assembly that does not include a first gas conduit and includes a bypass 438 including a first bypass valve 440 and a second bypass valve 442. The bypass 438 may be configured to divert the flow of molten salt from the vessel 402, essentially isolating the vessel 402 from the molten salt loop. This may be accomplished by activating the bypass valves 440, 442 such that molten salt passes through the bypass 438 and not into the vessel 402.

The example fission product extraction assembly 400 is operable to dislodge dissolved fission products by utilizing a change in partial pressure to make it more environmentally stable for the dissolved fission products to be in a gaseous phase of the vessel, rather than its liquid phase. Notably, the gas transfer assembly 412 includes a gas transfer assembly valve 428, which is operable to selectively connect a volume of the gas transfer assembly 412 to that of the vessel 402, effectively increasing the volume of the vessel 402. By isolating the vessel 402 and then opening the gas transfer assembly valve 428 the pressure of the vessel 402 decreases and the dissolved fission products therein are dislodged. Thereafter, the dislodged fission products may continue through the gas transfer assembly 412 into the carboy 414 and through the purification system in a substantially similar way to the other example fission product extraction systems discussed.

The fission product extraction assembly 400 may include the example purification systems previously described. Notably, despite not including the same mechanism for dislodging dissolved fission products from irradiated molten salt, the example fission product extraction assembly 400 may still employ the same or substantially similar purification systems and gas transfer assemblies as previously described in relation to other example embodiments. For example, the gas transfer assembly 412 may include a gas outlet positioned on a tope side of the vessel 402, whereby the gaseous fission products may ascend to upon dislodgement. As another example, the second gas conduit 410 may be configured to feed a gas throughout piping of the gas transfer assembly 412 and/or in the direction of the carboy 414, such that the dislodged fission products are deposited into the carboy 414. As another example, the carboy 414 may include an input for a PTA into the solution of the carboy to selectively react with the molybdenum compounds (e.g., sodium molybdate) therein. The carboy 414, may be fluidly connected to a separatory funnel 436 configured to separate the organic layer to a vessel 434 and the aqueous layer to the waste 422. The vessel 434 may be further connected to the extraction cartridge 418 configured to separate the molybdenum compound (e.g., molybdate) from the PTA (e.g., TOAB), such that the molybdenum compound may be input into a generator 420.

Figure 5:
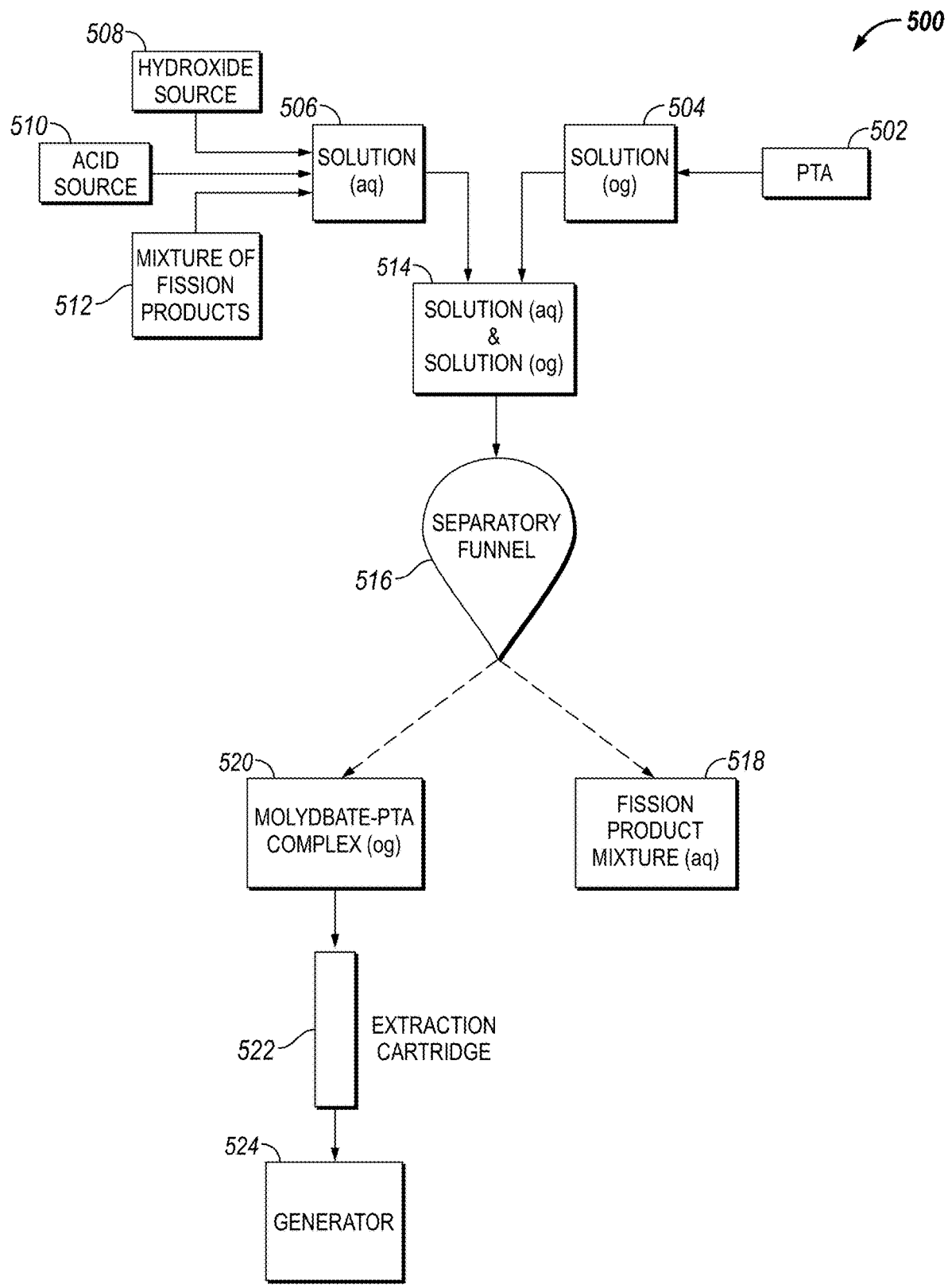
FIG. 5 illustrates an example process for purifying molybdenum with a phase transfer agent.

The present invention includes a purification system configured to isolate molybdenum compounds from the mixture of fission products extracted from an MSR system (e.g., MSR system 100) utilizing a PTA to transfer the molybdenum compound to an organic solution. FIG. 5 illustrates a schematic diagram of an example purification system 500. For clarity, the example purification system 500 may be operable to facilitate the plurality of steps of the purification process described herein. While FIGS. 3 and 4, and the accompanying description, demonstrate a wholistic system for both extracting the fission products and purifying the fission products, FIG. 5 illustrates a schematic diagram of the purification system in order to describe in more detail the steps of the purification process as described herein. Notably, the steps, processes, and systems described in relation to FIG. 5 may be implemented into systems 100, 200, 300, and 400. Additionally, the steps, processes, and systems described in relation to FIG. 5 may be accomplished offsite of the MSR system, in order to accomplish this, the carboy (e.g., carboy 116, 214, 314, or 414) may be removed from the MSR system and taken to a lab or other location for purification. In some embodiments, the carboy is connected to a separate vessel, which is detachable and configured to transfer the captured mixture of fission products to an offsite location for further processing in accordance with the present disclosure. Stated otherwise, the components and processes described in relation to FIG. 5 may occur as a wholistic system connected to an MSR system, or as a distinct system stemming from but disconnected to an MSR system.

The mixture of fission products 512 may be those captured by a fission product extraction system or fission product extraction assembly (e.g., those of FIG. 1, 2, 3, or 4). Notably this mixture of fission products 512 may include molybdenum complexes including molybdenum-99 isotopes. For example, the mixture of fission products 512 may include molybdenum hexafluoride. The mixture of fission products 512 may be added to an aqueous solution 506. The aqueous solution 506 may be included in a carboy (e.g., carboy 116, 214, 314, or 414) or separate vessel. A hydroxide source 508 or an alkaline metal hydroxide (e.g., sodium hydroxide or potassium hydroxide) may be added to the aqueous solution 506. Upon addition, the mixture of fission products 512 may react with the hydroxide source 508 or alkaline metal hydroxide to produce fission product salts. Notably, this may produce sodium molybdate in the aqueous solution 506. In several embodiments, an acid source 510 (e.g., hydrochloric acid) is added to the aqueous solution 506 to lower the pH of the solution. For example, a sufficient amount of acid 510 may be added to the aqueous solution 506 to cause the aqueous solution 506 to have a pH of 2 or less. Advantageously, by adding the acid source 510, the fission products salts may dissociate. Notably, this may cause sodium molybdate to dissociate into a molybdate ion. Additionally, addition of the acid source 510 may cause the molybdate to transition from a quaternary form to a linear form (such as that illustrated in FIG. 9A and FIG. 9B). Once in a linear form, the molybdenum compound may be more likely to react with the PTA.

In some embodiments, the mixture of fission products 512 is initially reacted with a base. Advantageously, by including a base into the mixture of fission products 512 several impurities (sometimes referred to as contaminates) that may be contained within the mixture of fission products 512 (i.e., inadvertently captured through the fission product extraction assembly) may precipitate out of the mixture. Following precipitation, the impurities may be filtered out of the mixture. Following filtration, the mixture may then be acidified according to the methods disclosed herein.

At basic or relatively basic conditions, the molybdate may have a tetrahedral geometry. When the pH is reduced to 2, the molybdate may become a cation called molybdenyl $(MoO_2)^{2+}$ which may be a linear geometry. Following acidification, the molybdate may become molybdic acid $(MoO_6)^{6-}$ which may be an octahedral geometry.

A PTA 502 may be added to an organic solution 504. The PTA 502 may be a phase transfer catalyst. The PTA 502 may be tetraoctylammonium bromide (TOAB). The organic solution 504 may be dichloromethane (DCM).

The method comprises the step of preparing an organic component (e.g., 504) comprising one or more phase transfer agents (e.g., 502) and one or more organic solvents. Any suitable water-insoluble organic hydrocarbon solvent or combination of solvents can be used. Exemplary organic solvents, include but are not limited to, pentane, 1,1,2-trichlorotrifluoroethane, cyclopentane, heptane, hexane, kerosene, iso-octane, petroleum ether, cyclohexane, n-butyl chloride, toluene, methyl t-butyl ether, o-xylene, chlorobenzene, o-dichlorobenzene, ethyl ether, dichloromethane, ethylene dichloride, n-butyl alcohol, isopropyl alcohol, n-butyl acetate, isobutyl alcohol, methyl isoamyl ketone, n-propyl alcohol, tetrahydrofuran, chloroform, methyl isobutyl ketone, ethyl acetate, methyl n-propyl ketone, methyl ethyl ketone, 1,4-dioxane, acetone, methanol, pyridine, 2-methoxyethanol, acetonitrile, propylene carbonate, N,N-dimethylformamide, dimethyl acetamide, N-methylpyrrolidone, and mixtures thereof. In certain embodiments, the one or more organic solvents comprises methyl ethyl ketone. In certain embodiments, the one or more organic solvents comprises dichloromethane. In certain embodiments, the one or more organic solvents comprises chloroform.

Following addition of the solutes into their respective solvents, the organic solution 504 and the aqueous solution 506 may be added together to create an aqueous and organic solution 514. Notably, this mixture may include a PTA 502 and a mixture of fission products 512 include molybdate comprising molybdenum-99. In several embodiments, the aqueous and organic solution 514 is mixed. For example, the aqueous and organic solution 514 may be mixed by simple manual agitation or by sonication. Advantageously, mixing by sonication may encourage the PTA 502 to react with the molybdate. Upon addition of the organic solution 504 to the aqueous solution 506, the PTA 502 may react with the molybdate, resulting in a PTA-molybdate complex. Importantly, while the molybdate may be present in the aqueous portion of the solution 514, the PTA-molybdate complex may be present in the organic portion of the solution 514. Stated otherwise, the PTA 502 may cause the molybdate to migrate from the aqueous portion to the organic portion or can be said to extract the molybdate from the aqueous solution 506 into the organic solution 504.

The aqueous and organic solution 514 may then be added to a separatory funnel 516 where an aqueous layer and an organic layer may be formed. The density of the organic component derives from the densities of the one or more organic solvents and any reagents dissolved therein. In certain embodiments, the density of the organic component is greater than the density of the aqueous component, and accordingly, the organic component will form the bottom layer when the aqueous and organic components are contacted and allowed to separate. In certain embodiments, the density of the organic component is less than the density of the aqueous component, and accordingly, the organic component will form the top layer when the aqueous and organic components are contacted and allowed to separate.

Following formation of distinct aqueous and organic layers, the separatory funnel 516 may then separate the distinct layers into separate vessels. The organic layer comprising the molybdate-PTA complex 520 may be passed to a separate vessel or directly to an extraction cartridge 522. The aqueous layer comprising a variety of fission products 518 may be passed to a separate vessel for further processing or may be disposed.

The organic solution containing the molybdate-PTA complex 520 may be passed through an extraction cartridge 522. The extraction cartridge 522 may be a solid phase extraction (SPE) cartridge. The extraction cartridge 522 may include a sorbent configured to extract the molybdate-PTA complex from the organic solution. Then, a stripping agent in an aqueous solution (e.g., ammonium bicarbonate in water) may be fed into the extraction cartridge 522 to remove the molybdate from the extraction cartridge 522 while the PTA remain bound to the sorbent.

In some embodiments, the molybdate-PTA complex 520 may be evaporated, resulting in a solid residue containing molybdenum.

Following use of the stripping agent, the filtrate from the extraction cartridge 522 may include molybdate ready for inclusion in the generator 524. Notably, the molybdate may include molybdenum-99 isotopes. The generator 524 may be a technetium-99m generator. Advantageously, the filtrate may be directly added to the generator 524 without the need for further processing. The filtrate may include molybdate in an aqueous solution with a pH of about 6 to 8.

Figure 6:
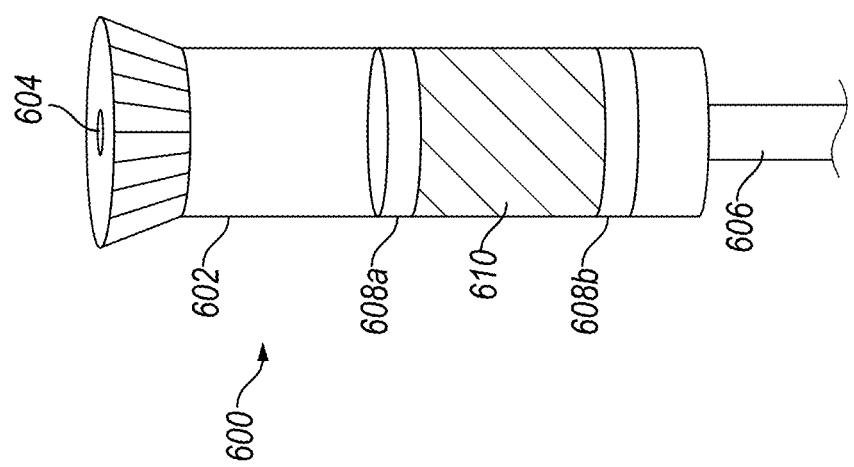
FIG. 6 illustrates a cross-sectional view of an example extraction cartridge.

FIG. 6 illustrates a cross-sectional view of an example extraction cartridge 600. The example extraction cartridge 600 may be that of cartridge 218, 318, 418, or 522. The extraction cartridge 600 may generally include a body 602, and inlet 604, an outlet 606, fritted filter discs 608a, 608b, and a sorbent bed 610. The body 602 may be generally configured to house the fritted filter discs 608a, 608b and the sorbent bed 610. The inlet 604 may be generally configured to receive fluid from a vessel (e.g., a vessel comprising the molybdate-PTA complex 520) while the outlet 606 may be generally configured to facilitate passage of fluid to the generator (e.g., generator 524, generator 420, generator 320, or generator 220). The fritted filter disc 608a may be configured to capture and filter larger particles entering the extraction cartridge 600, the sorbent bed 610 may be configured to capture and absorb certain constituents or other constituents depending on the specific chromatography method employed, and fritted filter disc 608b may be configured to capture any undesired particles as they exit the extraction cartridge 600. For example, the sorbent bed 610 may be configured to absorb the PTA while allowing molybdate ions to pass through. In several embodiments, the molybdate-PTA complex is initially retained by the sorbent bed 610 but configured to elute the molybdate and retain the PTA upon passing of a stripping agent through the extraction cartridge 600. Notably, the PTA may include octyl ligands (i.e., when TOAB is used as the PTA), which are nonpolar and may be trapped by the sorbent. The sorbent may be neutral in charge to better capture the nonpolar ligands of the PTA. Advantageously, the purification system is operable to produce a sample ready for input into a technetium-99m generator, such that no additional steps are needed.

Generally, molybdenum-99 may undergo beta decay to form technetium-99m, a valuable medical radioisotope. However, given technetium-99m's short half-life of only about 6 hours, medical practitioners will keep and store molybdenum-99 (having a half-life of about 66 hours), as it is more practical. Generators are used to store molybdenum-99 and process it into technetium-99m for medical use, specifics of which are known to those skilled in the art.

Advantageously, the present invention is operable to produce a sample to be processed by a techneitum-99m generator, sometimes referred to as a "technetium cow" or "moly cow" and referred to herein simply as the "generator." Following isolation by the cartridge, the resulting fission product sample may be in the form of a molybdate solution. The molybdate solution may be input directly into the generator for processing into pertechnetate (including technetium-99m).

The generator may generally include a plastic exterior, an internal radiation shielding layer, and input for molybdate (or other saline solution), internal tubing, a glass column composed of a sorbent and glass frit, a filter, and an output for pertechnetate.

The generator may generally include a column chromatography module operable to absorb molybdate until it decays into pertechnetate. An operator may then pour a saline solution (e.g., sodium chloride) into the input of the generator, which causes the pertechnetate to be eluted and collected for use.

Figure 7:
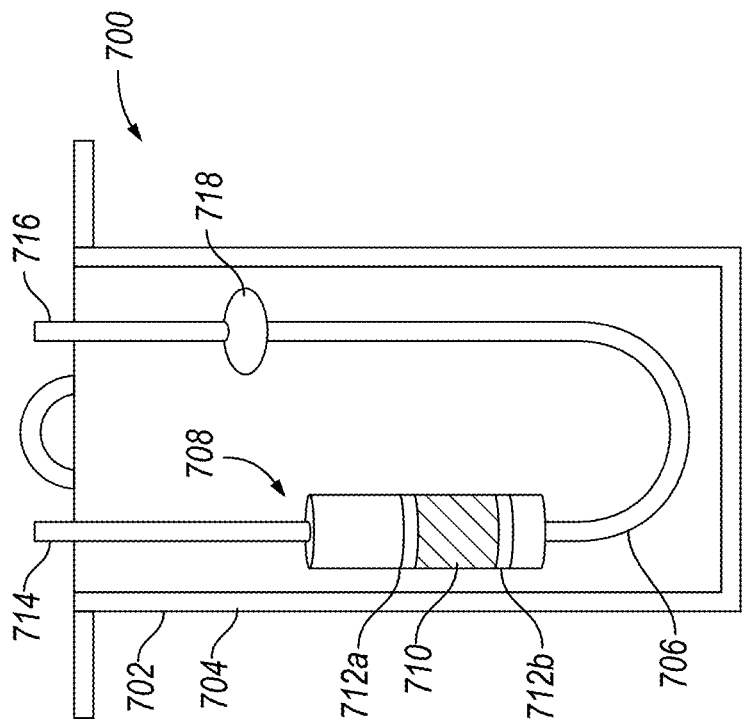
FIG. 7 illustrates a cross-sectional view of an example generator.

FIG. 7 illustrates a cross-sectional view of an example generator 700. The example generator 700 may be generator 220, 320, 420, or 524. The generator 700 may generally include an outer body 702 surrounding an internal radiation shielding layer 704 with an inlet 714 for introducing solution (e.g., molybdate in aqueous solution) and an outlet 716 for dispensing solution (e.g., pertechnetate) connected to internal tubing 706. For example, the inlet 714 may be configured to receive solution from outlet 606 of the example extraction cartridge 600. The generator 700 may further include internal tubing 706, a column module 708, and a filter 718. The internal tubing 706 may be configured for carrying the input solution throughout the generator 700, such that it travels through the column module 708 containing a sorbent bed 710 sandwiched by glass frits 712a, 712b. The column module 708 may be found along the path of the internal tubing 706, such that solution may be passed through. Finally, the generator 700 may include a filter 718 for capturing any undesired species. The column module 708 may be generally configured to absorb molybdate, such that it may undergo beta decay, thereafter and operator may pass a washing solution therethrough causing pertechnetate to be eluted. While a compendious description of a technetium-99m generator is provided herein, one of ordinary skill in the art will appreciate and understand the internal components and functions of a technetium-99m generator. Thus, the example generator 700 may include additional components not specifically described herein, but may still fall within the scope of the present disclosure.

Figure 8:
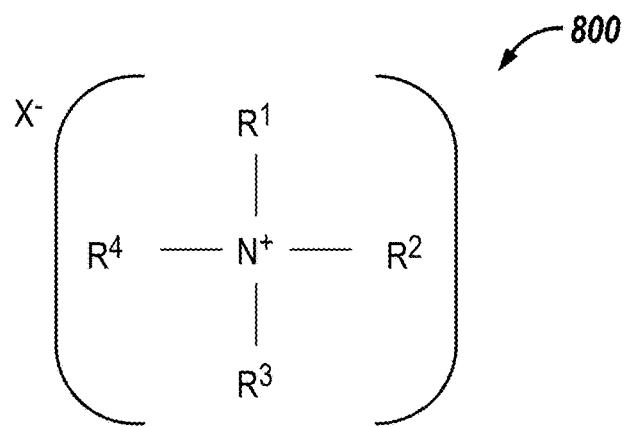
FIG. 8 illustrates an example structure of a phase transfer agent.

FIG. 8 illustrates an example structure of a phase transfer agent (PTA) 800 sometimes referred to as a phase transfer catalyst. The PTA 800 is generally configured to transfer the molybdenum compound (e.g., molybdate) from an aqueous solution to an organic solution. In several embodiments, the PTA 800 is configured to react with the sodium molybdate to create a molybdate-PTA complex while not reacting with the other fission products of the mixture of fission products. Stated otherwise, the PTA 800 may be selectively reactive towards the molybdate. Advantageously, the molybdate-PTA complex is soluble in an organic solution, thereby causing the molybdate (containing the molybdenum-99) to be extracted from an aqueous solution to an organic solution.

FIG. 8 illustrates the general structure of the PTA 800. In some embodiments, the X is or represents a halide while $R^1$, $R^2$, $R^3$, and $R^4$ are or represent alkyls. In some embodiments, X represents a halogen, such as bromine. In some embodiments, $R^1$, $R^2$, $R^3$, and $R^4$ represents alkyl groups with varying carbon chain lengths. For example, $R^1$, $R^2$, $R^3$, or $R^4$ may be independently selected from a group consisting of a methyl, ethyl, propyl, butyl, pentyl, hexyl, heptyl, octyl, nonyl, or decyl. Stated otherwise $R^1$, $R^2$, $R^3$, or $R^4$ may each comprise a carbon chain consisting of one, two, three, four, five, six, seven, eight, nine, or ten carbons. $R^1$, $R^2$, $R^3$, or $R^4$ may have the same number of carbons or may have a different number of carbons. Stated otherwise, one, some, several, or all R-groups (i.e., $R^1$, $R^2$, $R^3$, and $R^4$) may be a different lengthen or structured alkyl. While the discussion that follows may described the PTA as having ligands of the same length and structure, the PTA may have ligands (i.e., R-groups) of varying lengths and structures. In several embodiments, the carbon chains of $R^1$, $R^2$, $R^3$, and $R^4$ are joined by a nitrogen, as illustrated in FIG. 8. In several embodiments, $R^1$, $R^2$, $R^3$, and $R^4$ represent octyls. In several embodiments, the PTA 800 is a quaternary ammonium compound. In several embodiments, the PTA 800 is tetraoctylammonium bromide.

Figure 9A:
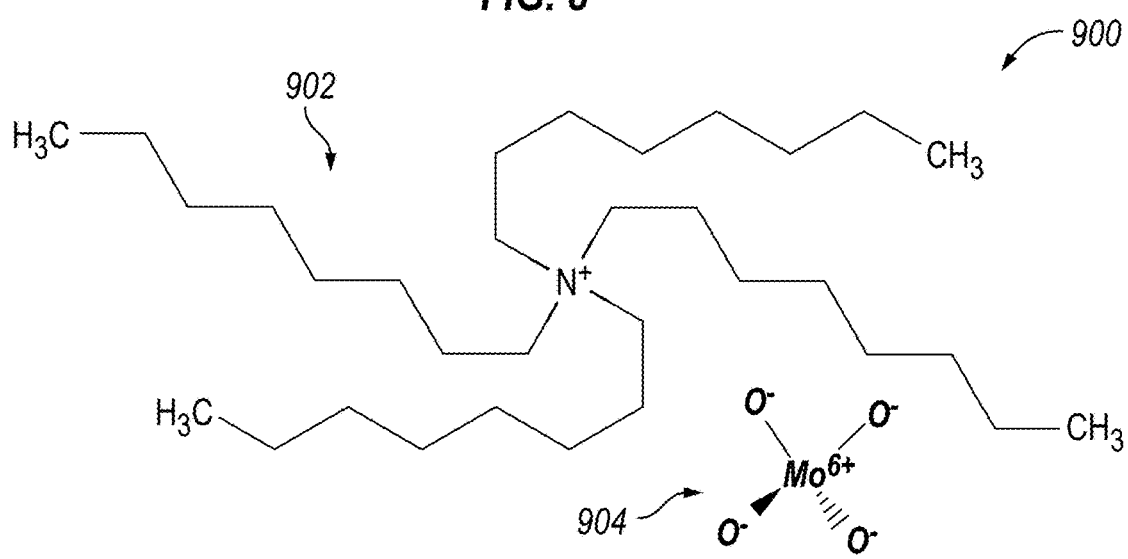
FIG. 9A illustrates an example molybdenum-PTA complex in accordance with the process for purifying molybdenum with a phase transfer agent.

FIG. 9A illustrates an example molybdenum-PTA complex 900 in accordance with the process for purifying molybdenum with a phase transfer agent. FIG. 9A illustrates an example complex resulting from the inclusion of the PTA into the solution containing the mixture of fission products and demonstrates how the molybdate is extracted from the aqueous solution. The molybdenum-PTA complex 900 may be soluble in organic solution and insoluble in aqueous solution. As illustrated in FIG. 9A, the example molybdenum-PTA complex 900 may comprise a PTA component 902 and a molybdenum component 904. The PTA component 902 may be TOAB and the molybdenum component 904 may be molybdate. Notably, the molybdenum-PTA complex 900 is soluble in an organic solution. Advantageously, by reacting TOAB with sodium molybdate the molybdenum-PTA complex 900 is formed, effectively extracting the molybdenum from an aqueous solution to an organic solution.

Figure 9B:
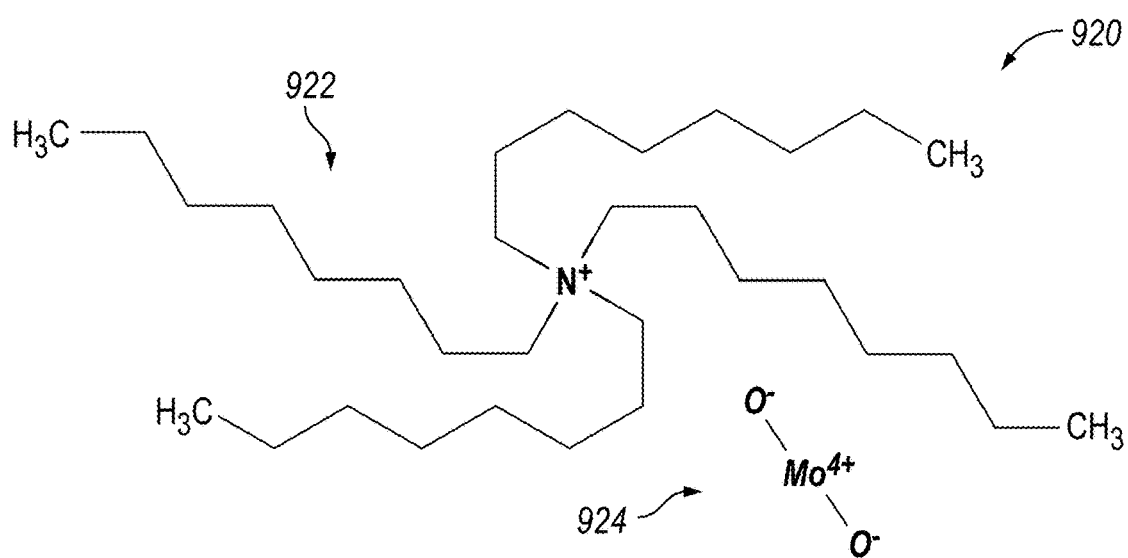
FIG. 9B illustrates another example molybdenum-PTA complex in accordance with the process for purifying molybdenum with a phase transfer agent.

FIG. 9B illustrates another example molybdenum-PTA complex 920 in accordance with the process for purifying molybdenum with a phase transfer agent. FIG. 9B illustrates an example complex resulting from the inclusion of the PTA into the solution containing the mixture of fission products and demonstrates how the molybdate is extracted from the aqueous solution. The molybdenum-PTA complex 900 may be soluble in organic solution and insoluble in aqueous solution. As illustrated in FIG. 9B, the example molybdenum-PTA complex 920 may comprise a PTA component 922 and a molybdenum component 924. The PTA component 922 may be TOAB and the molybdenum component 924 may be molybdenum dioxide. Notably, the molybdenum-PTA complex 920 is soluble in an organic solution. FIG. 9B illustrates an alternative form of the molybdenum compound 924. Here, the molybdenum compound 924 may take the form of a linear species, which may be better suited to bind to the PTA compound 922. The molybdenum compound 924, may be formed upon adjusting the pH of the mixture of fission products in aqueous solution to about 2. Advantageously, by reacting TOAB with sodium molybdate the molybdenum-PTA complex 920 is formed, effectively extracting the molybdenum from an aqueous solution to an organic solution.

EXPERIMENTATION

Experiments were run to test and quantify the amount of molybdenum extracted utilizing a PTA. For clarity, the discussion that follows consists of experimental parameters outlining the viability of the present invention. Stated otherwise, the discussion that follows describes an experiment run in order to demonstrate the effectiveness of the method of the present invention. Additionally, while the experimental parameters described herein may disclose specific parameters, one of ordinary skill in the art will appreciate that the purpose of this discussion is to demonstrate the viability and efficacy of the method and should not be construed as limiting.

Experimental materials used include UV-Vis spectrometer, Hewlett-Packard 8453; ICP-MS; ultrasonicator Hielscher ultrasound technology, UP400ST; and a centrifuge, Sargent-Welch Scientific Company. Experimental equipment includes a separatory funnel, general glassware, stir bars, and stir plates. Experimental chemical used include sodium molybdate ($6.68 \times 10^{-4}$M) in DI water; TOAB (0.00156M) in dichloromethane; HCl with a pH of 2; potassium thiocyanate (KSCN) (1.2M); acetone; and ammonium bicarbonate ($NH_4HCO_3$).

Initially, an acidic solution of HCl with a molar concentration of about 0.01M, with a pH of 2, was prepared using 0.1 mL of 12M HCl and 100 mL of deionized water. Next, 0.0154 g of sodium molybdate with a molecular mass of 241.89 g/mol was dissolved in a solution of HCl (0.01M) resulting in a molybdate solution with a pH of 2. Next, a magnetic stir bar was used to mix the molybdate solution. Next, 0.0861 g of TOAB was dissolved in 100 mL of dichloromethane (DCM) resulting in a TOAB solution. This solution was mixed with a magnetic stir bar.

70 mL of the TOAB solution was placed into a beaker. 70 mL of the molybdate solution was added to the same beaker. The resulting solution (referred to as the mixture) was sonicated for 10 minutes at 17% amplitude and 17-21 W. Following sonication, the mixture was placed into a separatory funnel and allowed to interact for about 18 hours. Two distinct layers were observed, an aqueous layer and an organic layer. The layers were separated using a separatory funnel into separate beakers.

An ultraviolet-visible absorbance spectrum of each solution was obtained in order to assess the migration of the molybdate from the aqueous solution to the organic solution. The UV-vis spectra that follows effectively establishes the utility of the method of the present invention.

Figure 10:
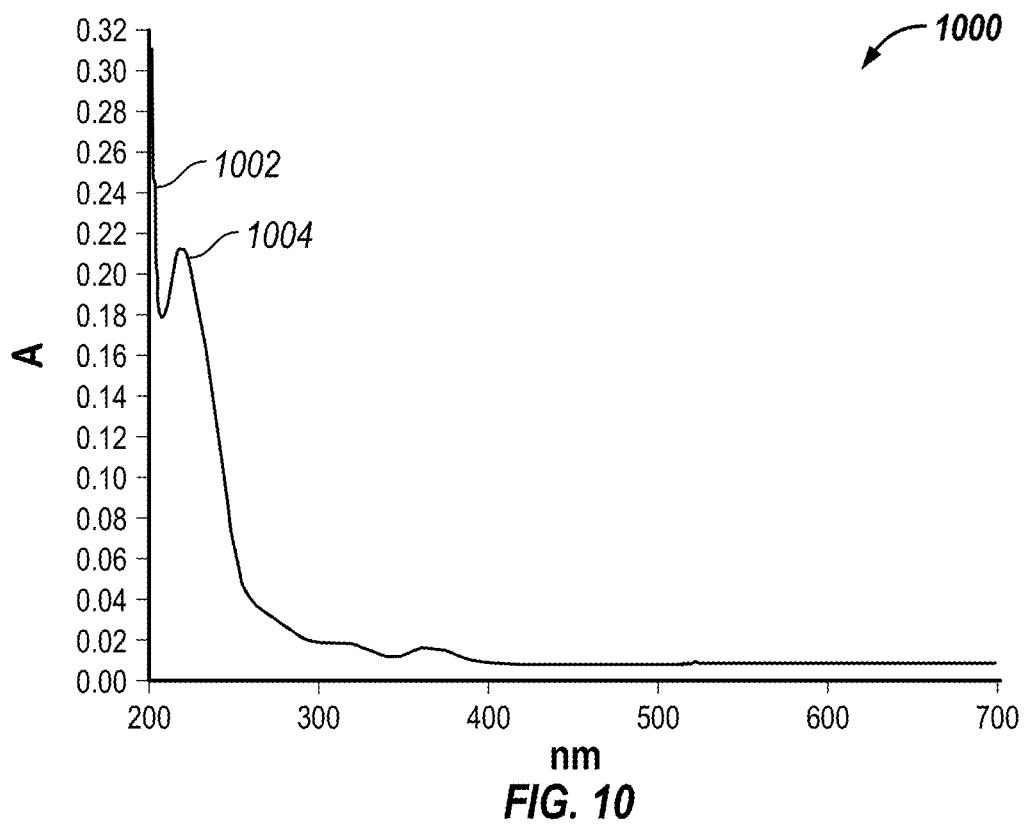
FIG. 10 illustrates an ultraviolet-visible spectrum of acidic sodium molybdate with a deionized water background.

FIG. 10 illustrates the UV-Vis spectrum 1000 obtained from the molybdate solution. Notably, the UV-Vis spectrum 1000 includes two peaks. The first peak 1002 at about 200 nm likely results from the presence of HCl in the molybdate solution while the second peak 1004 at about 220 nm results from the presence of sodium molybdate. Thus, establishing the presence of molybdate in the molybdate solution.

Figure 11:
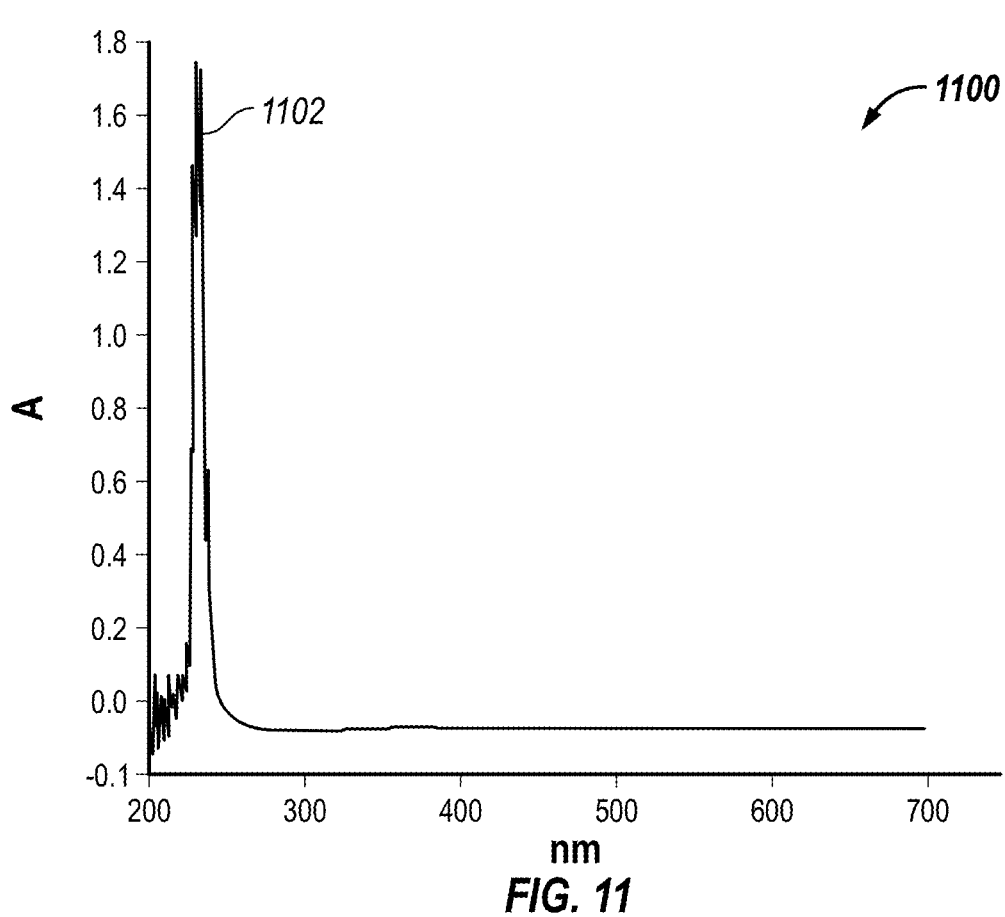
FIG. 11 illustrates an ultraviolet-visible spectrum of a tetraoctylammonium bromide with a dimethylacetamide background.

FIG. 11 illustrates the UV-Vis spectrum 1100 obtained from the TOAB solution. Notably, the UV-Vis spectrum 1100 includes only one peak 1102. This peak, at about 240-250 nm results from the presence of TOAB. Thus, establishing the presence of TOAB in the TOAB solution.

Figure 12:
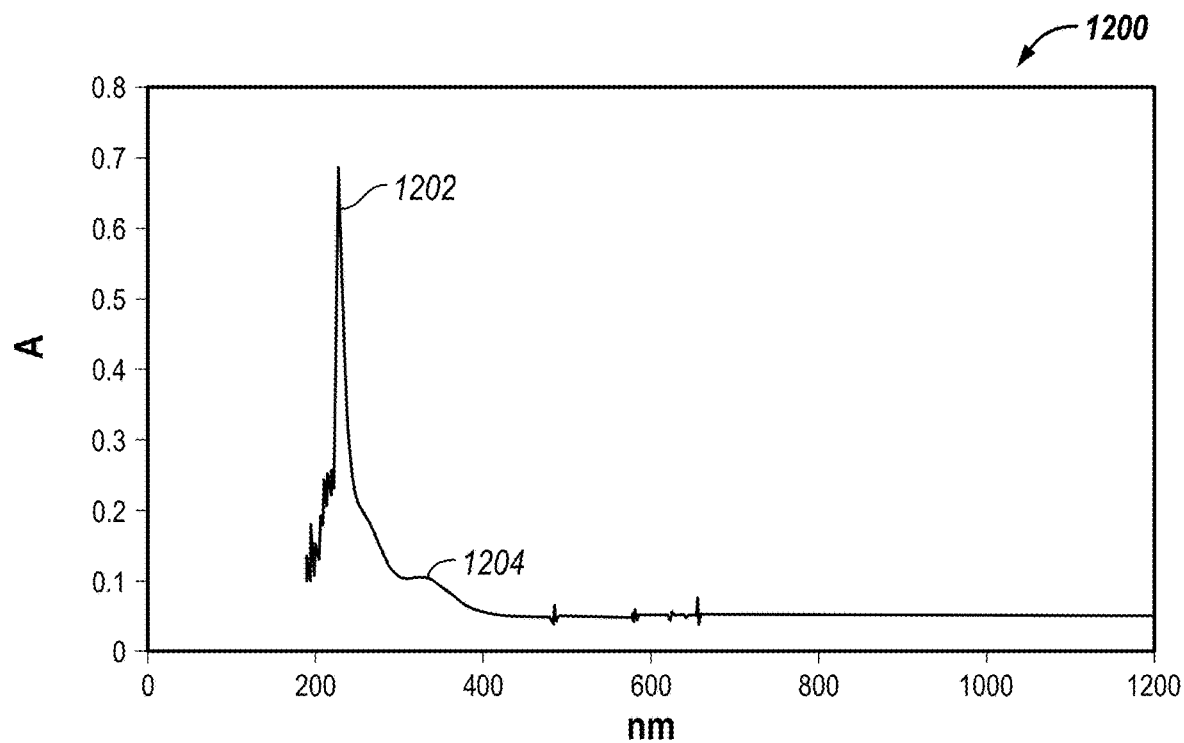
FIG. 12 illustrates an ultraviolet-visible spectrum of an organic solution following separation in accordance with the process for purifying molybdenum with a phase transfer agent.

FIG. 12 illustrates the UV-Vis spectrum 1200 obtained from the organic solution derived from the organic layer separated using the separatory funnel. Notably, the UV-Vis spectrum 1200 includes two peaks. The first peak 1202, around 240-250 nm results from the presence of TOAB in the organic layer while the second peak 1204, around 300-350 nm likely results from the presence of the molybdenum-PTA complex. Thus, spectrum 1200 effectively establishes the presence of the molybdenum-PTA complex in the organic layer, consequently validating the ability of the PTA (e.g., TOAB) to migrate or extract molybdate from an aqueous solution to an organic solution.

Figure 13:
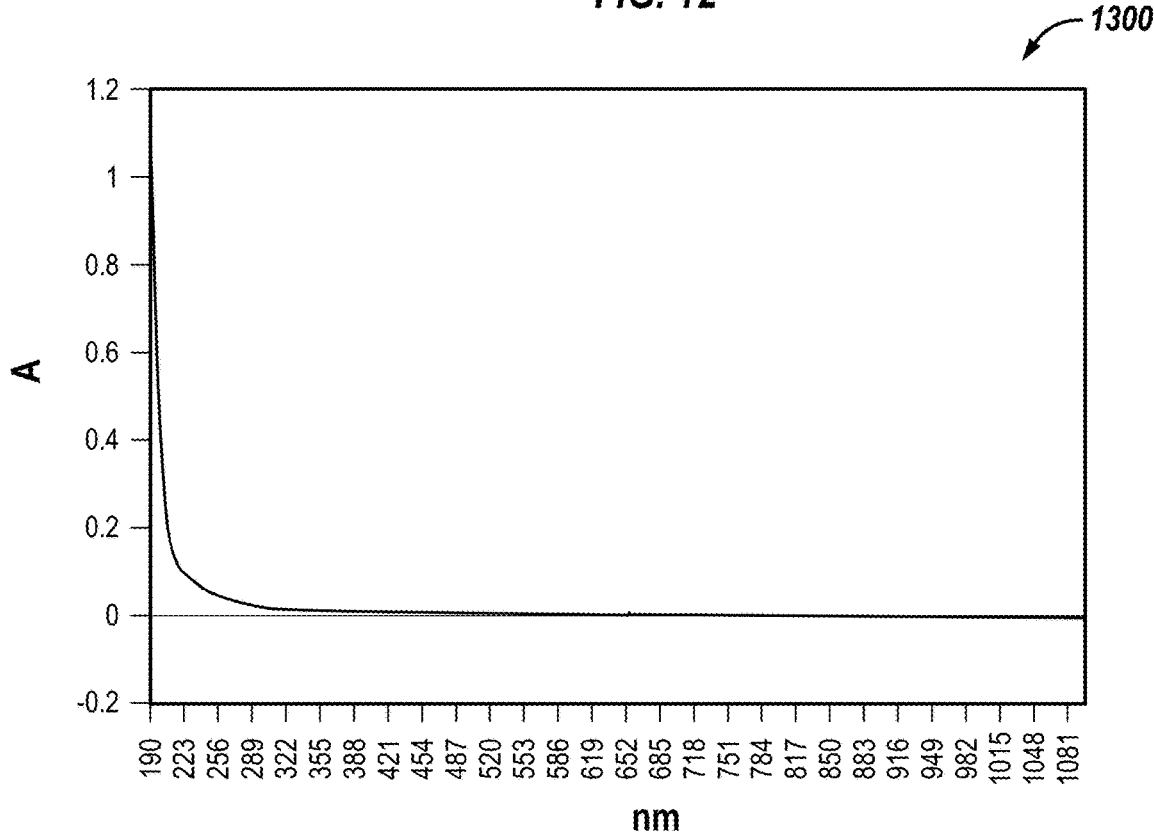
FIG. 13 illustrates an ultraviolet-visible spectrum of an aqueous solution following separation in accordance with the process for purifying molybdenum with a phase transfer agent.

FIG. 13 illustrates the UV-Vis spectrum 1300 obtained from the aqueous solution derived from the aqueous layer separated using the separatory funnel. Notably, the UV-Vis spectrum 1300 does not include a peak. Thus, spectrum 1300 effectively establishes the absence of molybdate in the aqueous layer, further validating the ability of the PTA (e.g., TOAB) to migrate molybdate from the aqueous solution to the organic solution.

Collectively, the spectra of FIGS. 10-14 establish that TOAB may be used to extract molybdate from an aqueous solution into an organic solution. This is made clear by the presence of a molybdate peak (i.e., peak 1004) in spectrum 1000 but the absence of such a peak in spectrum 1300. Additionally, spectrum 1100 lacks a peak for molybdate but such a peak (i.e., peak 1204) is found in spectrum 1200.

Figure 14:
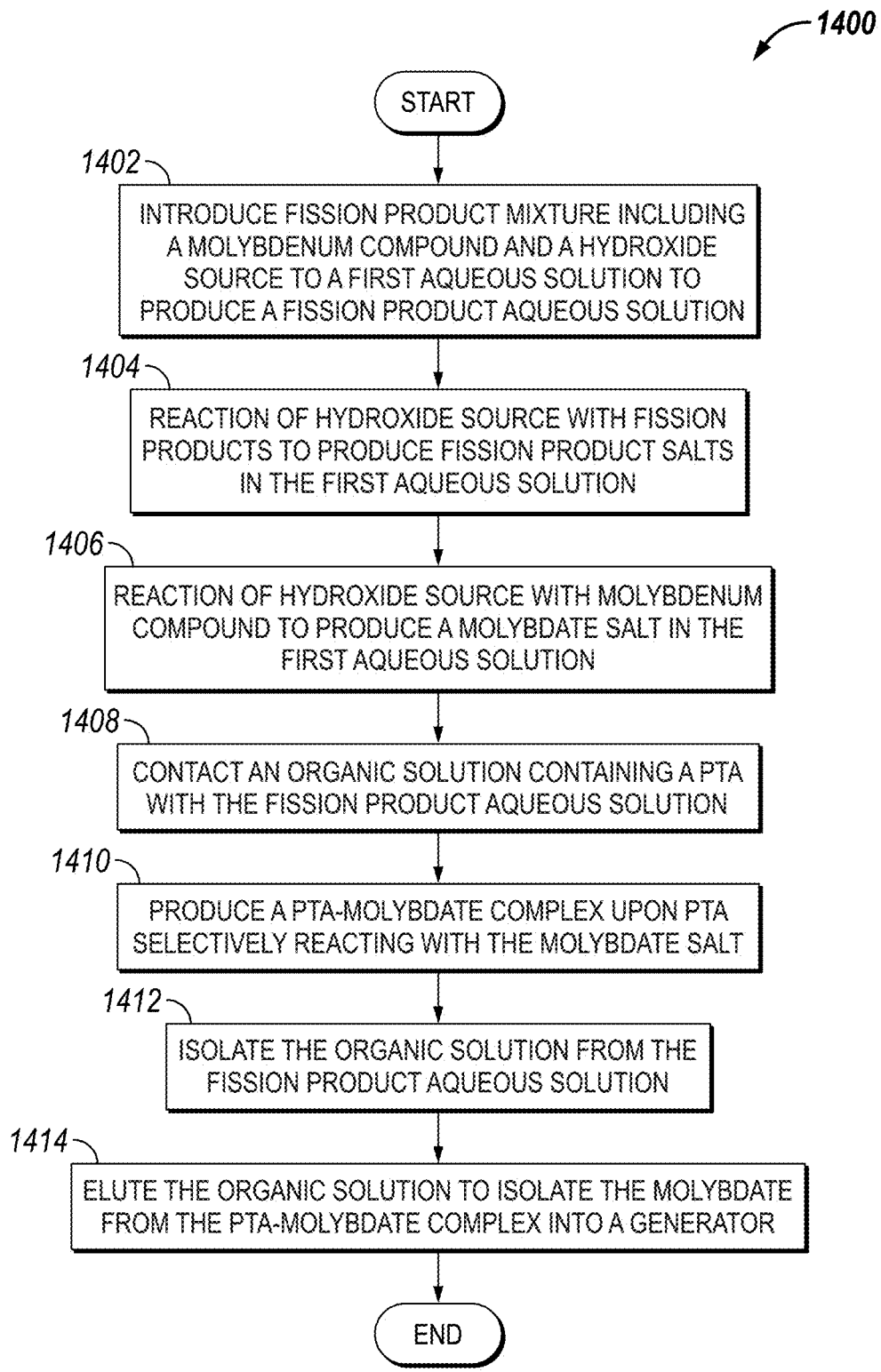
FIG. 14 illustrates a flow diagram of an example method for isolating molybdenum from a mixture of fission products.

FIG. 14 illustrates a flow diagram of an example method 1400 for isolating molybdenum from a mixture of fission products. At step 1402, a mixture of fission products including molybdenum compounds and a hydroxide source is introduced into an aqueous solution to produce a fission product aqueous solution. The mixture of fission products may be those captured by an extraction system, such as extraction system 101, 200, 300, or 400. The molybdenum compound may be molybdenum hexafluoride. The hydroxide source may be an alkali metal hydroxide, such as sodium hydroxide or potassium hydroxide. Such introduction may occur within a separate vessel or within carboy 116, 214, 314, 414. The resulting mixture may be that of aqueous solution 506 and may be referred to as the fission product aqueous solution. At step 1404, the fission products of the mixture of fission products react with the hydroxide source to produce fission product salts in the first aqueous solution. At step 1406, the molybdenum compound reacts with the hydroxide source to produce a molybdate salt in the fission product aqueous solution. In several embodiments, the molybdate salt is sodium molybdate. At step 1408, an organic solution containing a PTA contacts the fission product aqueous solution. The PTA may be PTA 502, PTA 800, or TOAB and the organic solution may be organic solution 504. Such contact may occur within a separate vessel or within carboy 116, 214, 314, 414. The resulting mixture may be that of aqueous and organic solution 514 of FIG. 5. Upon contact, and at step 1410, the PTA may selectively react with the molybdate to produce a molybdate-PTA complex, such as molybdate-PTA complex 900 or 920. Similarly, this may occur within carboy 116, 214, 314, 414 or in a separate vessel. Such a reaction may cause the molybdate to migrate from the aqueous layer to the organic layer. At step 1412, the organic solution is isolated from the fission product aqueous solution. In several embodiments, following combination, the organic and aqueous solutions are provided in a separatory funnel (e.g., separatory funnel 516) where distinct layers are formed. The separatory funnel may be then used to separate the layers. In several embodiments, the organic layer (containing the molybdate-PTA complex) is provided to an extraction cartridge while the aqueous layer (containing the mixture of fission products) is provided to a waste container or separate vessel for further processing. The extraction cartridge may be cartridge 218, cartridge 318, cartridge 418, extraction cartridge 522, or extraction cartridge 600. The waste container may be waste 322 or waste 422, the separate vessel may be that of 518 of FIG. 5. At step 1414, the organic solution is eluted to isolate the molybdate from the molybdate-PTA complex and subsequently placed in a generator. Many different elution techniques may be used to separate the molybdate from the molybdate-PTA complex. For example, a stripping agent (e.g., ammonium bicarbonate) may be used to wash the cartridge following addition of the organic layer. In several embodiments, step 1414 occurs in accordance with the description related to FIG. 6. The generator may be a technetium-99m generator or moly-cow. The generator may be generator 220, 320, 420, 534, or 700. Advantageously, the method 1400 provides a molybdate sample ready for inclusion in a generator without the need for additional preparation steps.

Figure 15:
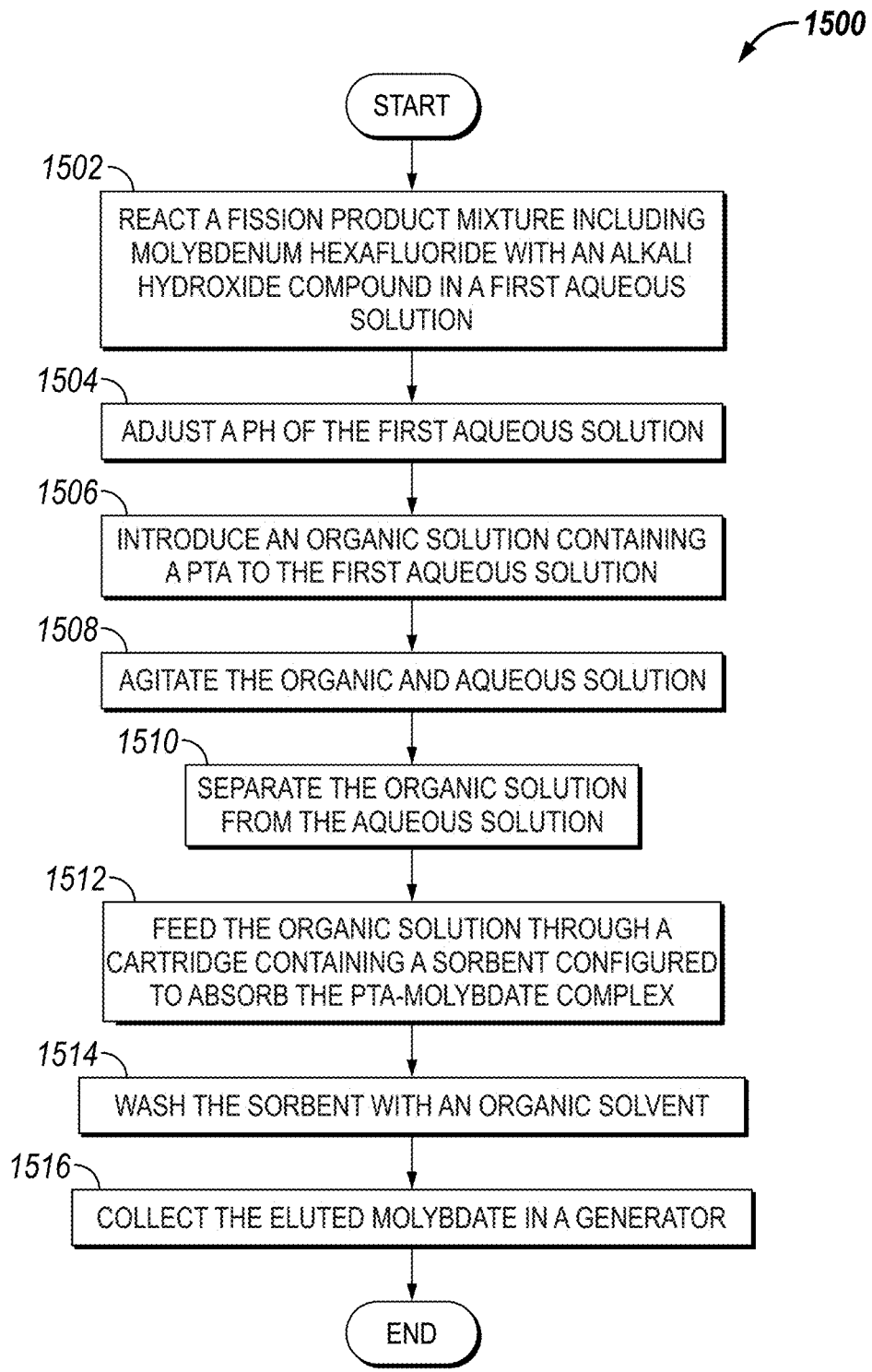
FIG. 15 illustrates a flow diagram of another example method for isolating molybdenum from a mixture of fission products.

FIG. 15 illustrates a flow diagram of another example method 1500 for isolating molybdenum from a mixture of fission products. At step 1502, a mixture of fission products including molybdenum hexafluoride reacts with an alkali hydroxide compound in a first aqueous solution. The mixture of fission products may be those captured by an extraction system, such as extraction system 101, 200, 300, or 400. The alkali hydroxide compound may be an alkali metal hydroxide, such as sodium hydroxide or potassium hydroxide. Such introduction may occur within a separate vessel or within carboy 116, 214, 314, 414. The resulting mixture may be that of aqueous solution 506 and may be referred to as the fission product aqueous solution. At step 1504, the pH of the first aqueous solution may be adjusted. Such adjustment may occur by the addition of an acid to the solution, such as HCl. The pH may be adjusted to a pH of about 2. At step 1506, an organic solution containing a PTA may be introduced to the first aqueous solution. The PTA may be PTA 502 or PTA 800 and the organic solution may be organic solution 504. Such contact may occur within a separate vessel or within carboy 116, 214, 314, 414. The resulting mixture may be that of aqueous and organic solution 514 of FIG. 5. At step 1508 the resulting mixture may be agitated. In several embodiments, agitation occurs through sonication, however the use of a magnetic stir bar may be used. Upon contact and mixing, the PTA may selectively react with the molybdate to produce a molybdate-PTA complex, such as molybdate-PTA complex 900 or 920. This may occur within carboy 116, 214, 314, 414 or in a separate vessel. Notably, this reaction may cause the molybdate to be extracted from the aqueous solution, effectively isolating molybdenum from the mixture of fission products. At step 1510, the organic solution may be separated from the aqueous solution. In several embodiments, following combination, the organic and aqueous solutions are provided in a separatory funnel (e.g., separatory funnel 516) where distinct layers are formed. The separatory funnel may be then used to separate the layers. At step 1512, the organic solution (i.e., organic layer from the separatory funnel) may be fed into a cartridge or a column containing a sorbent configured to absorb or retain the molybdenum-PTA complex. The extraction cartridge may be cartridge 218, cartridge 318, cartridge 418, extraction cartridge 522, or extraction cartridge 600. At step 1514, the sorbent of the extraction cartridge may be washed with an organic solvent or a stripping agent. The washing may cause the molybdate-PTA complex to disassociate such that the molybdate is eluted from the cartridge. Washing may occur through the use of a stripping agent, such as ammonium bicarbonate. Many different elution techniques may be used to separate the molybdate from the molybdate-PTA complex. In several embodiments, step 1514 occurs in accordance with the description related to FIG. 6. At step 1516, the molybdate that is eluted from the cartridge is collected in a generator. Stated otherwise, upon washing the sorbent of the cartridge with a stripping agent, the filtrate may contain the stripping agent and the molybdate in aqueous solution. Advantageously, by utilizing the washing step 1514, a sample is prepared for inclusion into a generator without the need for additional steps. The filtrate may have a pH of about 6-8. The generator may be a technetium-99m generator or moly-cow. The generator may be generator 220, 320, 420, 534, or 700.

Figure 16:
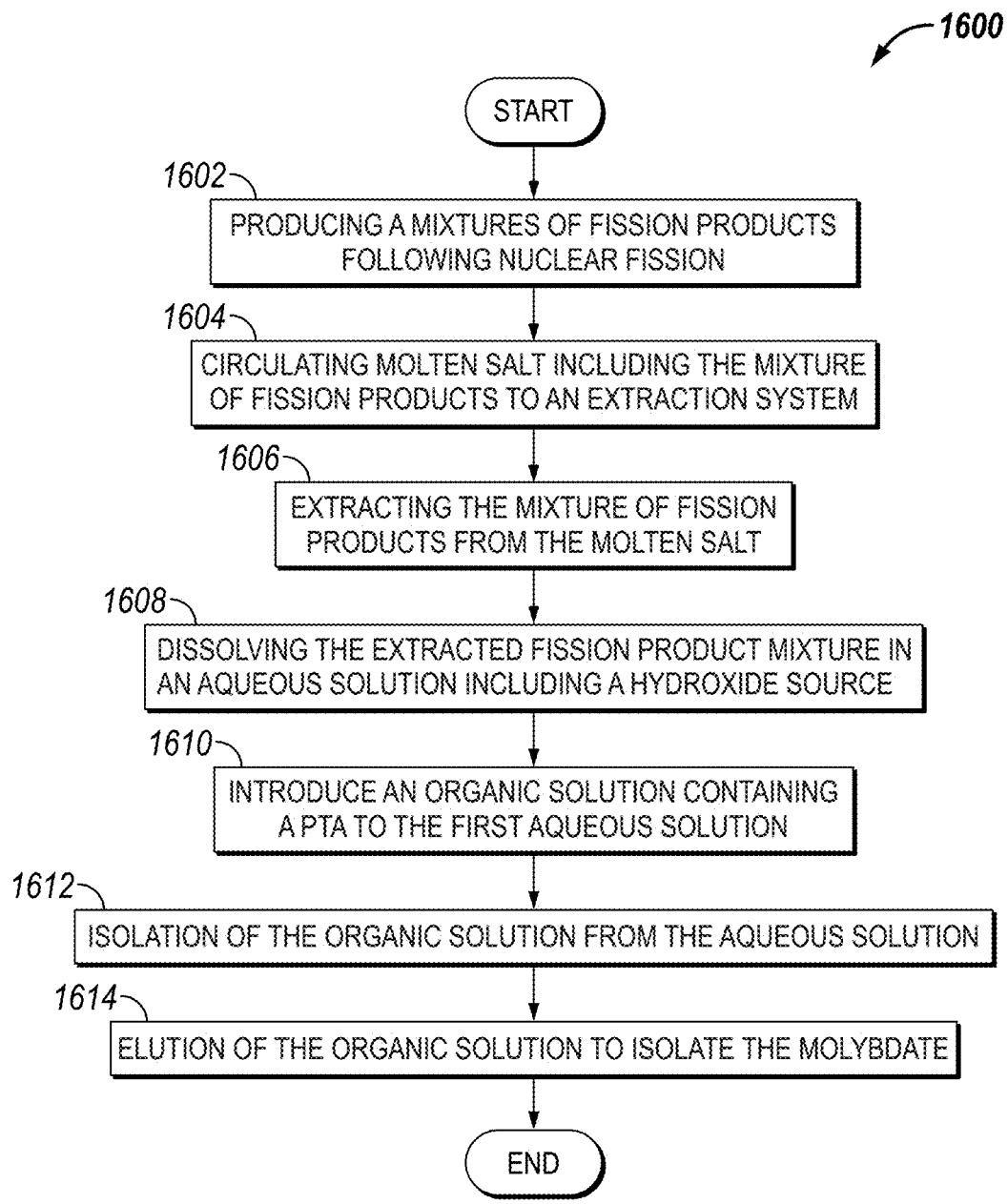
FIG. 16 illustrates a flow diagram of yet another example method for isolating molybdenum from a mixture of fission products.

FIG. 16 illustrates a flow diagram of yet another example method 1600 for isolating molybdenum from a mixture of fission products. At step 1602, a mixture of fission products are produced by nuclear fission. The mixture of fission products may include isotopes of interest, such as those disclosed with references to FIG. 1 and notably, molybdenum-99. Some fission products may be in a gaseous form, dissolved in a molten fuel salt (e.g., $MoF_6$, $TcF_6$, $IF_5$, $SbF_5$, among others). Nuclear fission may occur within the reactor vessel 102 of MSR system 100 of FIG. 1. At step 1604, the molten fuel salt containing the mixture of fission products may be circulated to an extraction system. Such circulation may occur via pump 104 of FIG. 1, which may be configured to circulate the molten fuel salt through the components of the MSR system 100 (i.e., a molten salt loop). At step 1606, the mixture of fission products may be extracted from the molten salt. The extraction system may be fission product extraction system 101, extraction system 200, fission product extraction assembly 300, or fission product extraction assembly 400. The extraction system may be generally configured to sparge a vessel with an inert gas to dislodge fission products contained within the molten salt. Such dislodged fission products may then be transferred to a carboy through a gas transfer assembly in accordance with the present disclosure. At step 1608, the extracted fission products are dissolved in an aqueous solution containing a hydroxide source. The extracted fission products may include molybdenum hexafluoride, which may react with the hydroxide source to create a molybdate salt. The hydroxide source may be an alkali metal hydroxide, such as sodium hydroxide or potassium hydroxide. Such introduction may occur within a separate vessel or within carboy 116, 214, 314, 414. The resulting mixture may be that of aqueous solution 506. At step 1610, an organic solution containing a PTA may be introduced into the aqueous solution. The PTA may be PTA 502 or PTA 800 and the organic solution may be organic solution 504. Such contact may occur within a separate vessel or within carboy 116, 214, 314, 414. The resulting mixture may be that of aqueous and organic solution 514 of FIG. 5. The PTA may be TOAB. Such introduction may cause the PTA to react with the molybdate to create a molybdate-PTA complex, such as that illustrated in FIGS. 9A and 9B. At step 1612, the organic solution is isolated from the aqueous solution. Step 1612 may be facilitated by a separatory funnel. However, one of ordinary skill in the art will appreciate that there are many known methods of separating organic solutions from aqueous solutions. The separatory funnel used may be separatory funnel 516. At step 1614, the organic solution is eluted to isolate the molybdate. The organic solution (i.e., organic layer from the separatory funnel) may be fed into a cartridge or a column containing a sorbent configured to absorb or retain the molybdenum-PTA complex. The extraction cartridge may be cartridge 218, cartridge 318, cartridge 418, extraction cartridge 522, or extraction cartridge 600. The sorbent of the extraction cartridge may then be washed with an organic solvent. The washing may cause the molybdate-PTA complex to disassociate such that the molybdate is eluted from the cartridge. Washing may occur through the use of a stripping agent, such as ammonium bicarbonate. Many different elution techniques may be used to separate the molybdate from the molybdate-PTA complex. In several embodiments, step 1614 occurs in accordance with the description related to FIG. 6. The molybdate (contained within the filtrate) that is eluted from the cartridge may then be collected and stored in a generator.

What is claimed is:

1. A method for isolating molybdate from a mixture of fission products comprising:
   introducing the mixture of fission products, including a molybdenum compound and a hydroxide source, to a first aqueous solution to produce a fission product aqueous solution;
      wherein the hydroxide source reacts with the fission products to produce fission product salts in the fission product aqueous solution;
      wherein the hydroxide source reacts with the molybdenum compound to produce a molybdate salt in the fission product aqueous solution;
   contacting an organic component comprising a phase transfer agent (PTA) and an organic solvent with the fission product aqueous solution;
      wherein the PTA reacts with the molybdate salt to produce a PTA-molybdate complex in the organic component;
   isolating the organic component from the fission product aqueous solution; and
   eluting the organic component to isolate the molybdate from the PTA-molybdate complex.

2. The method of claim 1, further comprising adjusting a pH of the fission product aqueous solution to about 2.

3. The method of claim 2, further comprising adding an acid to the fission product aqueous solution prior to contact with the organic component.

4. The method of claim 1, wherein the hydroxide source comprises sodium hydroxide.

5. The method of claim 1, wherein the molybdenum compound is molybdenum hexafluoride.

6. The method of claim 1, wherein the PTA is configured to extract the molybdate salt from the fission product aqueous solution into the organic component.

7. The method of claim 1, wherein the PTA is configured to be reactive with the molybdate salt and nonreactive with other fission products of the fission products.

8. The method of claim 1, further comprising filtering contaminants from the aqueous solution prior to contact with the organic component.

9. The method of claim 1, further comprising adding a stripping agent to the organic component.

10. A method for isolating molybdate from a mixture of fission products comprising:
    introducing the mixture of fission products, including a molybdenum compound and a hydroxide source, to a first aqueous solution to produce a fission product aqueous solution;
       wherein the hydroxide source reacts with the fission products to produce fission product salts in the fission product aqueous solution;
       wherein the hydroxide source reacts with the molybdenum compound to produce a molybdate salt in the fission product aqueous solution;
    contacting an organic component comprising a phase transfer agent (PTA) and an organic solvent with the fission product aqueous solution;
       wherein the PTA reacts with the molybdate salt to produce a PTA-molybdate complex in the organic component;
    isolating the organic component from the fission product aqueous solution; and
    eluting the organic component to isolate the molybdate from the PTA-molybdate complex; and
    wherein the PTA is a compound having a formula of

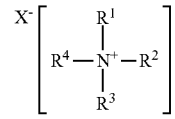

wherein X is a halide; and
    wherein $R^1$, $R^2$, $R^3$, and $R^4$ is an alkyl.

11. The method of claim 10, wherein X is a hydroxide and $R^1$, $R^2$, $R^3$, and $R^4$ are $C_8$ alkyls.

12. The method of claim 11, wherein $R^1$, $R^2$, $R^3$, and $R^4$ are different alkyls.

13. The method of claim 10, wherein the PTA is configured to extract the molybdate salt from the fission product aqueous solution into the organic component.

14. A method for isolating molybdate from a mixture of fission products comprising:
    introducing the mixture of fission products, including a molybdenum compound and a hydroxide source, to a first aqueous solution to produce a fission product aqueous solution;
       wherein the hydroxide source reacts with the fission products to produce fission product salts in the fission product aqueous solution;
       wherein the hydroxide source reacts with the molybdenum compound to produce a molybdate salt in the fission product aqueous solution;
    contacting an organic component comprising a phase transfer agent (PTA) and an organic solvent with the fission product aqueous solution;

wherein the PTA reacts with the molybdate salt to produce a PTA-molybdate complex in the organic component;

isolating the organic component from the fission product aqueous solution; and eluting the organic component to isolate the molybdate from the PTA-molybdate complex; and wherein the PTA is a quaternary ammonium compound.

15. The method of claim 14, wherein the quaternary ammonium compound is tetraoctylammonium bromide.

16. The method of claim 14, wherein the molybdenum compound is molybdenum hexafluoride.

17. The method of claim 13, wherein the PTA is configured to extract the molybdate salt from the fission product aqueous solution into the organic component.

* * * * *